(12) United States Patent
Davis et al.

(10) Patent No.: US 10,394,731 B2
(45) Date of Patent: Aug. 27, 2019

(54) SYSTEM ON A CHIP COMPRISING RECONFIGURABLE RESOURCES FOR MULTIPLE COMPUTE SUB-SYSTEMS

(71) Applicant: Amazon Technologies, Inc., Seattle, WA (US)

(72) Inventors: Mark Bradley Davis, Austin, TX (US); David James Borland, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 362 days.

(21) Appl. No.: 14/578,010

(22) Filed: Dec. 19, 2014

(65) Prior Publication Data

US 2016/0179717 A1   Jun. 23, 2016

(51) Int. Cl.
*G06F 13/28* (2006.01)
*G06F 13/40* (2006.01)
*G06F 15/78* (2006.01)

(52) U.S. Cl.
CPC .......... *G06F 13/28* (2013.01); *G06F 13/4027* (2013.01); *G06F 15/7892* (2013.01); *G06F 2213/0038* (2013.01)

(58) Field of Classification Search
CPC ... G06F 13/28; G06F 13/4027; G06F 15/7892
See application file for complete search history.

(56) References Cited

U.S. PATENT DOCUMENTS

| | | | |
|---|---|---|---|
| 7,412,588 B2 | 8/2008 | Georgiou et al. | |
| 7,783,788 B1 | 8/2010 | Quinn et al. | |
| 8,082,547 B1 | 12/2011 | Herington et al. | |
| 8,990,455 B1* | 3/2015 | Owen | G06F 13/10 710/22 |
| 9,264,384 B1 | 2/2016 | Sundaresan et al. | |
| 9,684,597 B1* | 6/2017 | Eiriksson | G06F 12/082 |
| 2004/0121797 A1 | 6/2004 | Gupta | |
| 2005/0144223 A1 | 6/2005 | Yang et al. | |
| 2006/0136929 A1* | 6/2006 | Miller | G06F 9/5083 718/105 |
| 2007/0094419 A1 | 4/2007 | Rajendran | |
| 2007/0209037 A1 | 9/2007 | Sato et al. | |

(Continued)

FOREIGN PATENT DOCUMENTS

| | | |
|---|---|---|
| JP | 2001290510 | 10/2001 |
| JP | 2003316752 | 11/2003 |

(Continued)

OTHER PUBLICATIONS

U.S. Appl. No. 14/578,004, filed Dec. 19, 2014, Titled: System on a Chip Comprising Multiple Compute Sub Systems.

(Continued)

*Primary Examiner* — Nimesh G Patel
(74) *Attorney, Agent, or Firm* — Kilpatrick Townsend & Stockton LLP

(57) ABSTRACT

Embodiments of the technology can provide the flexibility of fine-grained dynamic partitioning of various compute resources among different compute subsystems on an SoC. A plurality of processing cores, cache hierarchies, memory controllers and I/O resources can be dynamically partitioned between a network compute subsystem and a server compute subsystem on the SoC.

19 Claims, 13 Drawing Sheets

(56) References Cited

U.S. PATENT DOCUMENTS

| | | | |
|---|---|---|---|
| 2007/0217439 A1 | 9/2007 | Lemaire et al. | |
| 2008/0086853 A1 | 4/2008 | Nanda et al. | |
| 2008/0122482 A1 | 5/2008 | Sato | |
| 2008/0172524 A1 | 7/2008 | Singh et al. | |
| 2009/0228684 A1* | 9/2009 | Ramesh | G06F 15/7867 712/29 |
| 2012/0079155 A1 | 3/2012 | Damodaran et al. | |
| 2012/0259982 A1* | 10/2012 | Tatsubori | G06F 9/5027 709/226 |
| 2013/0138836 A1* | 5/2013 | Cohen | H04L 49/351 709/250 |
| 2013/0268706 A1 | 10/2013 | Yun et al. | |
| 2014/0100837 A1 | 4/2014 | Heinen et al. | |
| 2014/0101419 A1 | 4/2014 | Giddi et al. | |
| 2014/0254388 A1* | 9/2014 | Kumar | H04L 47/2425 370/238 |
| 2015/0039790 A1 | 2/2015 | Bonen et al. | |
| 2016/0154760 A9 | 6/2016 | Davis et al. | |

FOREIGN PATENT DOCUMENTS

| | | |
|---|---|---|
| JP | 2005044361 | 2/2005 |
| JP | 2005512186 | 4/2005 |
| JP | 2007047986 | 2/2007 |
| JP | 2008044581 | 2/2008 |
| JP | 2010518472 | 5/2010 |
| JP | 2011238231 | 11/2011 |
| JP | 2012038293 | 2/2012 |
| JP | 2014038652 | 2/2014 |
| WO | 2003029995 | 4/2003 |
| WO | 2005022380 | 3/2005 |

OTHER PUBLICATIONS

U.S. Appl. No. 14/622,661, filed Feb. 13, 2015, Titled: Multi-Mode System on a Chip.
U.S. Appl. No. 14/623,914, filed Feb. 17, 2015, Titled: System on a Chip Comprising an I/O Steering Engine.
PCT/US2015/067163, "International Search Report and Written Opinion", dated May 3, 2016, 12 pages.
EP15823480.7, "Office Action", dated Jul. 4, 2018, 4 pages.
JP2017-531504, "Office Action", dated May 28, 2018, 8 pages.

* cited by examiner

SYSTEM ON A CHIP COMPRISING RECONFIGURABLE RESOURCES FOR MULTIPLE COMPUTE SUB-SYSTEMS

BACKGROUND

Many organizations and companies provide computing services over a plurality of communication networks. For example, computing services may include web services such as web storage or virtual servers that can be provided over the Internet to different clients. In some instances, virtual servers may be rented out to clients on an as needed basis.

Generally speaking, a system may include subsystems with fixed computing resources. In most instances, computing resources on a system may not be utilized efficiently due to irregular work load demands. For example, at a certain time a high performance subsystem may be limited by a fixed number of computing resources while a low performance subsystem may not be utilizing all of its computing resources. Hence, in most instances, the system may not perform efficiently due to a fixed number of resources assigned to each subsystem.

BRIEF DESCRIPTION OF THE DRAWINGS

Various embodiments in accordance with the present disclosure will be described with reference to the drawings, in which.

DETAILED DESCRIPTION

Figure 1:
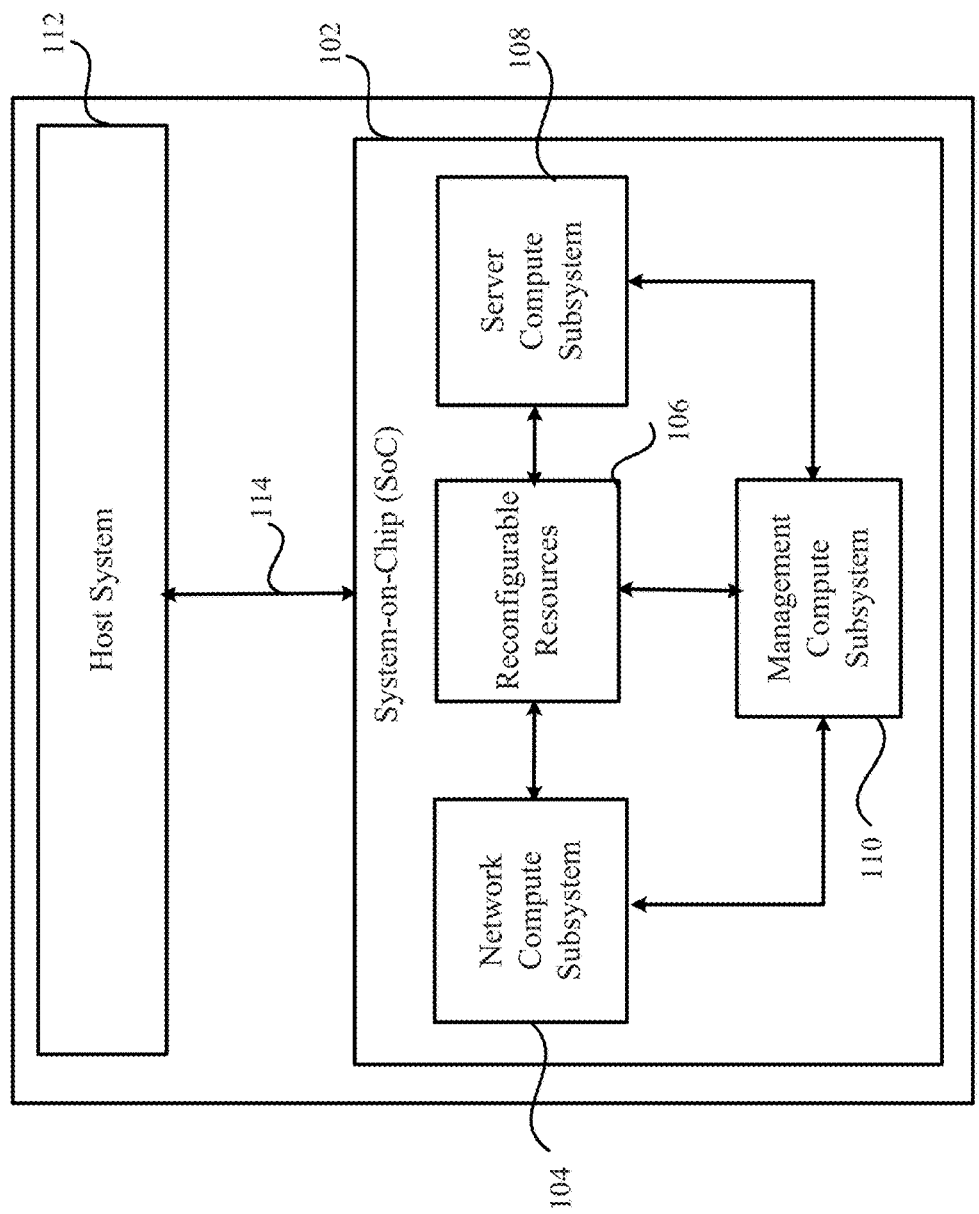
FIG. 1 illustrates a block diagram of a system according to some embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generally, a computing system may include one or more compute subsystems to perform several different functions. In most instances, each compute subsystem may include a fixed number of resources to perform the intended function. Once the computing system is fabricated, the number and kinds of resources are fixed for each compute subsystem for the computing system. Therefore, regardless of the use case, clients are limited to specific pre-determined configuration of resources for each compute subsystem.

Furthermore, with fixed resources, each subsystem may not perform efficiently as the work load demand varies over time. For example, a first subsystem's performance may be limited by the fixed number of resources to perform its intended function for a certain time period when the work load is high while a second subsystem may not be utilizing all its resources due to low work load during that time period. Hence, in most instances, the system may not perform efficiently due to fixed number of resources assigned to each subsystem.

Embodiments of the disclosed technologies can provide partitioning of various resources among multiple compute subsystems on a system-on-chip (SoC), either dynamically or at boot-time. For example, the SoC may be communicatively coupled to a host system (e.g., an x86 server) to provide various services such as traffic monitoring, traffic shaping, computing, etc. In some embodiments, the SoC may include multiple compute subsystems to perform various functions. For example, according to certain embodiments, the SoC may include a server compute subsystem for providing compute services and a network compute subsystem for at least managing network traffic for the host system and the server subsystem. Each compute subsystem may include a plurality of resources such as processing resources (e.g., processor cores), memory resources (e.g., cache hierarchies, memory controllers, memory channels, etc.), I/O resources (e.g., peripheral devices, network and bus interfaces), etc. In embodiments of the disclosed technology, each of the resources may be reconfigurable which can be dynamically or at boot time allocated to different compute subsystems. For example, the host system may provide a range of virtual server instances that may require reconfiguration of different compute subsystems for each of the virtual server instance to match the needed resources to the throughput requirement of the virtual server instance. Embodiments of the disclosed technology allow more efficient use of the resources for each compute subsystem thus increasing the throughput of the system. Further, embodiments of the disclosed technology can allow for reconfiguration and isolation of various resources for each compute subsystem using dedicated physical layers or hardware paths. For example, a plurality of configured resources can be dynamically assigned to a first physical layer fabric for the network compute subsystem and/or to a second physical layer fabric for the server compute subsystem. Thus, embodiments of the technology can provide hardware security and jitter/performance isolation by having independent physical layers for different compute subsystems.

Computer networks may typically include a plurality of servers that can host data and provide services to multiple clients or organizations. For example, servers can provide services such as cloud computing, analytics, web services, storage, databases, applications, deployment services, etc. to a potentially larger number of client computers. The clients or organizations can use these services or data to power a wide variety of workloads such as storage, data processing and warehousing, web and mobile applications, archive and many other tasks. Generally, clients request services or data from the servers and the servers respond by executing certain tasks to service the request and/or provide the data over the network. The network traffic may vary depending upon a number of factors such as number of clients requesting services at a certain time, capacity of the servers, etc.

In some instances, a network system can monitor network traffic to regulate the traffic and to minimize bandwidth congestion. For example, the network system may be communicatively coupled to a host system (e.g., an x86 server) that provides web services to different clients. The network system may include one or more processor cores, caches, network acceleration logic, memory controllers and an I/O subsystem, etc. In some embodiments, the network system may also perform other functions such as traffic shaping, network storage processing, etc. associated with the web services offered by the server (e.g., host system). In some instances, the functionality of the network system may be implemented as a network compute subsystem on a System-on-Chip (SoC) that may be communicatively coupled to the host system. For example, the SoC can be coupled to the host system (e.g., one or more servers) using a plug-in card or soldered on the motherboard of the host system.

In some embodiments, the SoC may also include a server compute subsystem and a management compute subsystem in addition to the network compute subsystem. For example, the server compute subsystem may be configured to provide compute services and the management compute subsystem may be configured to manage the resources for the network compute subsystem and the server compute subsystem. In some instances, the network compute subsystem and the server compute subsystem may include fixed resources. For example, the resources may include processing resources (e.g., processor cores), memory resources (e.g., (e.g., Level 1 (L1) caches, Level 2 (L2) caches, Level 3 (L3) or last level caches, memory controllers, memory channels, etc.) and I/O resources (network and bus interfaces).

In most instances, once the computing system is fabricated, the number and kinds of resources are fixed for each compute subsystem for the computing system. In addition, if a SoC has been fabricated to include a network compute subsystem with its fixed resources and a server compute subsystem with its fixed resources, the SoC may be limited to provide only certain kinds of services based on the fixed resources for each compute subsystem. For example, in some instances, the SoC may only provide low performance network processing if the network compute subsystem has a small number of fixed processing and memory resources. Similarly, in some instances, the SoC may only provide low performance compute services if the server compute subsystem has a small number of fixed processing and memory resources. Therefore, regardless of the use case, clients are limited to specific pre-determined configuration of resources for each compute subsystem.

Furthermore, in some instances, the fixed resources assigned to each compute subsystem may result in inefficient use of resources. For example, in some instances, the network compute subsystem may not utilize all its resources when performing low performance networking services (e.g., low network or bandwidth congestion). Similarly, in some instances, the server compute subsystem may not utilize all its resources when performing low performance compute services (e.g., not all the virtual server instances are rented out).

Embodiments of the disclosed technology can provide fine-grained dynamic partitioning of various resources among multiple compute subsystems on a system-on-chip (SoC). In some embodiments, a compute subsystem may include a subsystem with one or more processing cores. For example, the SoC may be communicatively coupled to a host system (e.g., an x86 server) to provide various services such as traffic monitoring, traffic shaping, computing, etc. In some embodiments, the SoC may include multiple subsystems such as a network compute subsystem to monitor the network traffic, a server compute subsystem to provide compute services, a management compute subsystem to manage the resources and an I/O subsystem with various interfaces for internal and external communication. Various resources on the SoC may include processor cores, several levels of cache hierarchy, such as Level 1 (L1) caches, Level 2 (L2) caches, Level 3 (L3) or last level caches, memory controllers, I/O, etc. In embodiments of the disclosed technology, several of the resources may be reconfigurable that can be dynamically allocated to different subsystems. For example, in some implementations, the configured resources can be individually routed to different physical layers.

In certain embodiments of the technology, the management compute subsystem may configure each resource dynamically. In some embodiments, the management compute subsystem may determine the configuration of each resource for a subsystem based on the work load demand. For example, if the server compute subsystem is performing high performance computations at a certain time as compared to the network compute subsystem, some of the resources of the network compute subsystem may be shifted to the server compute subsystem and vice-versa. In some embodiments, the resources may have a default configuration that may be based on a policy. In some instances, these policies are applied at boot-up time. For example, the management compute subsystem may determine a default configuration of the resources at boot-up time based on one or more pins or data fields of a software register. Thus some embodiments of the disclosed technology can allow reconfiguration of the resources once the SoC has been fabricated. For example, the resources may be divided evenly among various subsystems after power on reset.

In certain embodiments of the disclosed technologies, a fabric bridge can provide a routing fabric to map each configured resource to a physical layer. In some embodiments, multiple physical layers may exist where each physical layer can be associated with a coherent fabric. For example, the fabric bridge can map one or more reconfigurable resources (e.g., processor cores, last level caches, memory controllers, I/O controllers, etc.) to a first physical layer fabric for the network compute subsystem or to a second physical layer fabric for the server compute subsystem. In various embodiments of the disclosed technologies, the first physical layer fabric and the second physical layer fabric can be physically isolated from each other to provide reduced jitter and security risks. For example, having processing and memory resources that can be physically isolated by their respective physical layers for each compute subsystem can allow any security risks to be contained within that compute subsystem.

In some embodiments, a steering unit may be used to steer the configured resources to individual compute subsystems. For example, the steering unit may include one or more multiplexers to steer the reconfigured processing cores, L3 caches, memory controllers, I/O resources, etc. to either the network compute subsystem or to the server compute subsystem.

A typical SoC may include functionalities of a system integrated into a single chip. For example, an SoC can include multiple processor cores, volatile and non-volatile memory modules, memory controllers, one or more internal buses, standard interfaces, peripherals, voltage regulators, power management circuits, timing resources such as oscillators and phase locked loop, etc. Implementing the functionalities of multiple chips on a single chip can reduce manufacturing and assembly costs. In addition, the SoCs generally have smaller footprints and space requirements. Therefore, SoC implementations generally consume less power and are more cost effective as compared to a multi-chip system implementing the same functionality.

Embodiments of the disclosed technology can further provide the flexibility of fine-grained dynamic partitioning of various resources among different compute subsystems on a SoC. The ability to reconfigure each resource dynamically can allow efficient utilization of resources, thus meeting work load demands without compromising the performance.

Although, embodiments of the disclosed technology are described and shown as dynamically partitioning the resources between two compute subsystems on the SoC, aspects of the technology are not limited to partitioning the resources only between two compute subsystems. For example, in some implementations, the resources may be partitioned among multiple compute subsystems (e.g., more than two) on a SoC without deviating from the scope of the disclosed technology.

FIG. 1 illustrates an exemplary system 100 that can be used for performing embodiments described herein. Generally, a SoC can include reconfigurable resources that can be repartitioned dynamically among a network compute subsystem and a server compute subsystem. A management compute subsystem can be configured to manage the resources for the network compute subsystem and the server compute subsystem.

FIG. 1 illustrates a SoC 102 configured to communicate with a host system 112. The communication between the SoC 102 and the host system 112 may be performed using a host interface 114 such as a Peripheral Component Interconnect Express (PCIe) interface or any other suitable interface.

In some instances, the host system 112 may provide a multi-tenant platform to multiple clients. For example, the host system 112 may provide services such as cloud computing, cloud storage, analytics, web services, databases, applications, deployment services, website hosting, etc. to different clients. The host system 112 may include a server, for example, an x86 server. In some embodiments, one or more processors in the host system 112 may be connected to the sockets on the SoC 102.

The SoC 102 may include a network compute subsystem 104, reconfigurable resources 106, a server compute subsystem 108 and a management compute subsystem 110. In some embodiments, a compute subsystem may include a plurality of processing cores wherein each processing core can be reconfigured to function as part of the network compute subsystem 104 or as part of the server compute subsystem 108. In some embodiments, the reconfigurable resources 106 may include reconfigurable memory resources, wherein at least a portion of the memory resources can be reconfigured to function as part of the network compute subsystem 104 or as part of the server compute subsystem 108.

The network compute subsystem 104 may be configured to provide network related functionalities such as network traffic shaping, network acceleration, network storage processing, etc. In some embodiments, the network compute subsystem 104 may include at least some functionalities of a network interface controller (NIC) or a network coprocessor. In certain embodiments, the network compute subsystem 104 may include some functionalities related to web services offered by the host system 112, for example, billing, rate, traffic shaping, encryption, choking, etc.

The server compute subsystem 108 may be configured to provide compute services, e.g., virtual or physical resources for the host system 112. For example, compute services may include launching virtual machine instances of various sizes, associating storage volumes to the virtual machines, etc. on demand. In some embodiments, the server compute subsystem 108 may be used to offload some of the work load of the host system 112. In some instances, the host system 112 together with the server compute subsystem 108 may provide high performance compute services. For example, the host system 112 may focus on processing quick turnaround services and may offload low performance work load to the server compute subsystem 108 thus increasing the throughput of the system.

The reconfigurable resources 106 may include a plurality of resources that may be reconfigured dynamically. For example, in some embodiments, the reconfigurable resources 106 may include reconfigurable processing cores, reconfigurable memory resources, reconfigurable I/O resources and reconfigurable last level cache resources. In some embodiments, at least some of the reconfigurable resources 106 may be partitioned dynamically to function as part of the network compute subsystem 104 or the server compute subsystem 108. For example, in some implementations, the reconfigurable resources 106 may be individually routed to different physical layers using a fabric bridge or a suitable steering unit.

The reconfigurable processing cores may include a plurality of processing cores. In some embodiments, the reconfigurable processing cores may include multi-core processors. A multi-core processor may include multiple processing units within the same processor. In some embodiments, dynamic partitioning of the processing cores can be performed at the grain level of 2-core processors. In some embodiments, the multi-core processors may share certain resources, such as busses and L1 and/or L2 cache between multiple-cores. In some instances, each core in a single or multi-core processor may also include multiple executing logical processors (or threads). In such a core (that supports multiple logical processors), several stages of the execution pipeline and also lower level caches (e.g., L1 or L2) may also be shared. In some implementations, embodiments of the disclosed technology can allow routing the reconfigurable processing cores to different physical layers associated with different compute subsystems using dedicated hardware paths that can provide hardware security and performance/jitter isolation.

The reconfigurable memory resources may include reconfigurable memory controllers, etc. The memory controllers may include DDR controllers, DDR2 controllers or any suitable controller and may be used to manage the access to an external memory. In some embodiments, an L1 and/or L2 cache may be shared between multiple-cores of a processor. Thus, in some embodiments, partitioning of processing resources may include partitioning of processing cores with the shared L1/L2 cache. In some implementations, embodiments of the disclosed technology can allow routing the reconfigurable memory resources to different physical layers associated with different compute subsystems using dedicated hardware paths that can provide hardware security and performance/jitter isolation.

The reconfigurable I/O resources may include various I/O interfaces for internal and external communication. For example, the reconfigurable I/O resources may include a first interface to communicate with the host system 112, a second interface to communicate with the network compute subsystem 104, a third interface to communicate with the server compute subsystem 108 and a fourth interface to communicate with the network. For example, the host interface 114 may be used to communicate with the host system 112. The host interface 114 may be implemented using any standard interface such as the PCIe interface. In some implementations, embodiments of the disclosed technology can allow routing the reconfigurable I/O resources to different physical layers associated with different compute subsystems using dedicated hardware paths that can provide hardware security and performance/jitter isolation.

The reconfigurable last level cache resources may include last level caches or Level 3 (L3) caches. In some embodiments, one L3 cache may be shared by one compute subsystem. In this specification, terms last level caches and L3 caches may be used interchangeably, however, in some systems the last level cache may be a Level 2 cache or a Level 4 cache or any other level without deviating from the scope of the technology. In some implementations, embodiments of the disclosed technology can allow routing the reconfigurable last level cache resources to different physical layers associated with different compute subsystems using dedicated hardware paths that can provide hardware security and performance/jitter isolation.

The management compute subsystem 110 may be configured to manage various resources for different compute subsystems on the SoC 102. In some embodiments, the management compute subsystem 110 may be configured to dynamically perform fine-grained partitioning of the reconfigurable resources 106 between the network compute subsystem 104 and the server compute subsystem 108. In some embodiments, the management compute subsystem 110 may configure the resources for the network compute subsystem 104 and the server compute subsystem 108 after boot-up. For example, the management compute subsystem 110 may reconfigure at least some of the resources at boot-up to configure the SoC 102 as a network only system or as a server only system by mapping all the processing and memory resources to the network compute subsystem 104 or to the server compute subsystem 108 respectively. In some embodiments, the management compute subsystem 110 may include one or more resources that may be shared between the network compute subsystem 104 and the server compute subsystem 108. For example, in some implementations, the shared resources may be mapped to both the network compute subsystem 104 and the server compute subsystem 108 using a fabric bridge or a steering unit.

In some embodiments, the reconfigurable resources 106 may be partitioned based on a default configuration at power-on reset. In some embodiments, the default configuration may be based on a policy (e.g., provided by an organization) or may be an operator provided configuration. The management compute subsystem 110 may be configured to dynamically repartition the reconfigurable resources 106 after the power on reset. In some embodiments, the management compute subsystem 110 may determine the configuration for repartition of the reconfigurable resources 106 based on a software or hardware configuration. For example, the management compute subsystem 110 may determine the repartition configuration based on one or more pins of the SoC 102 or based on a data field in a software register.

Figure 2:
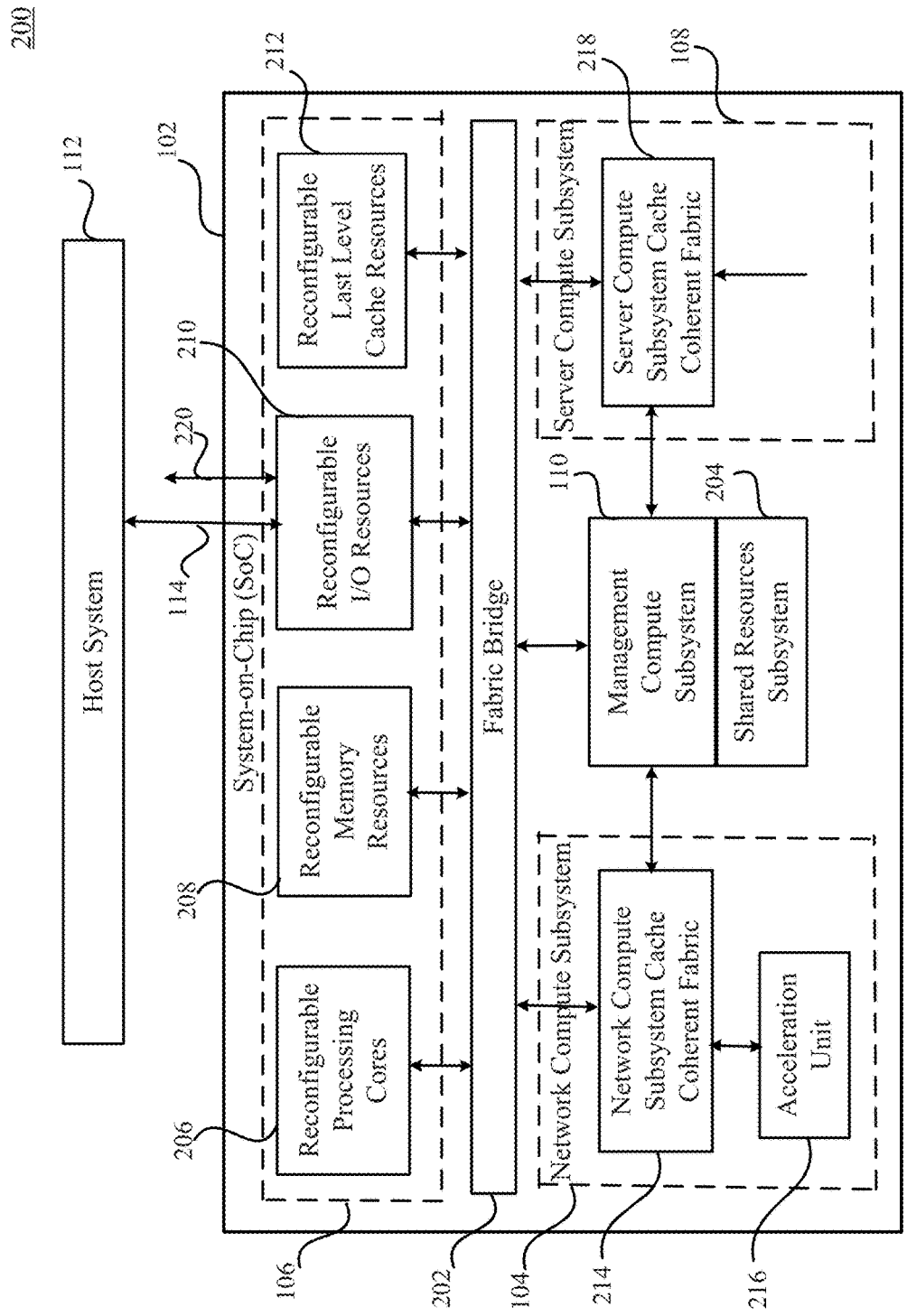
FIG. 2 illustrates a high level block diagram of a system-on-chip (SoC) with reconfigurable resources according to certain embodiments of the disclosure.

FIG. 2 illustrates a high level diagram of a system 200 with reconfigurable resources according to some embodiments of the technology.

The SoC 102 may include the network compute subsystem 104, server compute subsystem 108, management compute subsystem 110 and a shared resources subsystem 204. The reconfigurable resources 106 may be communicatively coupled to the network compute subsystem 104, server compute subsystem 108 and the management compute subsystem 110 using a fabric bridge 202. The reconfigurable resources 106 may include reconfigurable processing cores 206, reconfigurable memory resources 208, reconfigurable I/O resources 210 and reconfigurable last level cache resources 212. The reconfigurable resources 106 can be configured dynamically by the management compute subsystem 110 and can be repartitioned by the management compute subsystem 110 between the network compute subsystem 104 and the server compute subsystem 108. The fabric bridge 202 can map each configured resource in the reconfigurable resources 106 to either a first physical layer fabric for the network compute subsystem 104 or to a second physical layer fabric for the server compute subsystem 108. In certain embodiments, a steering unit may be used to steer the configured resources to the network compute subsystem 104 or to the server compute subsystem 108. In some embodiments, the shared resources may be routed to both the network compute subsystem 104 and the server compute subsystem 108 using the fabric bridge 202 or a steering unit (not shown).

The network compute subsystem 104 may include a network compute subsystem cache coherent fabric 214 and an acceleration unit 216. In some embodiments, at least a portion of the reconfigurable processing cores 206, reconfigurable memory resources 208, reconfigurable I/O resources 210 and the reconfigurable last level cache resources 212 are reconfigurable to function as part of the network compute subsystem 104. In some embodiments, the network compute subsystem cache coherent fabric 214 may be coupled to the processing cores, memory resources, I/O resources and the last level cache resources that may have been mapped to the network compute subsystem 104. For example, the network compute subsystem cache coherent fabric 214 may represent the first physical layer fabric for the network compute subsystem 104 that can physically isolate the configured resources for the network compute subsystem 104 from the configured resources for the server compute subsystem 108.

The server compute subsystem 108 may include a server compute subsystem cache coherent fabric 218. In some embodiments, at least a portion of the reconfigurable processing cores 206, reconfigurable memory resources 208, reconfigurable I/O resources 210 and the reconfigurable last level cache resources 212 are reconfigurable to function as part of the server compute subsystem 108. In some embodiments, the server compute subsystem cache coherent fabric 218 may be coupled to the processing cores, memory resources, I/O resources and the last level cache resources that may have been mapped to the server compute subsystem 108. For example, the server compute subsystem cache coherent fabric 218 may represent the second physical layer fabric for the server compute subsystem 108 that can physically isolate the configured resources for the server compute subsystem 108 from the configured resources for the network compute subsystem 104.

The reconfigurable processing cores 206 may include a plurality of reconfigurable processing cores that can be partitioned between the network compute subsystem 104 and the server compute subsystem 108. In some embodiments, at least one processing core from the reconfigurable processing cores 206 is reconfigurable to function as part of the network compute subsystem 104 or as part of the server compute subsystem 108. For example, in one instance, the reconfigurable processing cores 206 may include twelve, 2-core processors. At power on reset, four, 2-core processors may be mapped to the network compute subsystem 104 and eight, 2-core processors may be mapped to the server compute subsystem 108 based on a default configuration. For example, the default configuration may be based on a policy or provided by an operator. In some embodiments, L1 and/or L2 caches may be shared between multiple cores of a processor. For example, each L1 and/or L2 cache (e.g., 4 MB cache) may be integrated with one multi-core processor (e.g., 2-core processor). In some instances, L1 cache may be used as a primary cache and L2 cache may be used as a secondary cache. Thus, reconfiguration of the reconfigurable processing cores 206 may include partitioning of the plurality of reconfigurable processing cores with the integrated L1/L2 caches. The management compute subsystem 110 may reconfigure the reconfigurable processing cores 206 dynamically to repartition the resources between the network compute subsystem 104 and the server compute subsystem 108. In some embodiments, the management compute subsystem 110 may repartition the resources dynamically between the network compute subsystem 104 and the server compute subsystem 108 depending upon the performance requirement of each subsystem. For example, the host system 112 may be configured to provide a range of virtual instance types (e.g., small computing, big computing, small networking, big networking, etc.) that may require reconfiguration of different subsystems for each of the virtual server instances to match the needed resources to the throughput requirement of the server instance. In some embodiments, each configurable processor core in the reconfigurable processing cores 206 may have an interface to connect to a compute subsystem via the fabric bridge 202 or a steering unit. For example, in some implementations, the reconfigurable processing cores 206 may be routed individually to the network compute subsystem 104 or to the server compute subsystem 108 using the routing fabric (e.g., fabric bridge 202) or the steering unit (not shown).

The reconfigurable memory resources 208 may include memory controllers. The memory controllers may include DDR controllers, DDR2 controllers or any suitable controller and may be used to manage the access to an external memory (e.g., system memory). In some embodiments, the reconfigurable memory resources 208 may be reconfigured based on the bandwidth and the memory capacity of each processing core. In some embodiments, at least a portion of the memory resources from the reconfigurable memory resources 208 may be configured to function as part of the network compute subsystem 104 or as part of the server compute subsystem 108. In some embodiments, each configurable resource in the reconfigurable memory resources 208 may have an interface to connect to a compute subsystem via the fabric bridge 202 or a steering unit. For example, in some implementations, the reconfigurable memory resources 208 may be routed individually to the network compute subsystem 104 or to the server compute subsystem 108 using the routing fabric (e.g., fabric bridge 202) or the steering unit (not shown).

The reconfigurable I/O resources 210 may include various I/O interfaces such as network interface, internal and external bus interfaces. In some embodiments, the reconfigurable I/O resources 210 may include a first interface to communicate with the host system 112, for example, the host interface 114 as discussed with reference to FIG. 1. In some embodiments, the reconfigurable I/O resources 210 may include a second interface to communicate with the network compute subsystem 104. For example, in some embodiments, the network compute subsystem 104 may communicate with the host system 112 using the second interface that may have been mapped to the host interface 114 by the fabric bridge 202. In some embodiments, the reconfigurable I/O resources 210 may include a third interface to communicate with the server compute subsystem 108. For example, in some embodiments, the server compute subsystem 108 may communicate with the host system 112 using the third interface that may have been mapped to the host interface 114 by the fabric bridge 202. In some embodiments, the first, second and the third interfaces may be implemented using a standard interfaces such as PCIe interface. The reconfigurable I/O resources 210 may include a fourth interface to communicate with the network, for example, a network interface 220. For example, the network interface 220 may be based on a standard such as Ethernet, token ring, Wi-Fi, ATM (Asynchronous Transfer Mode), etc. In some embodiments, the reconfigurable I/O resources 210 may also include an interface to connect to external mass storage devices such as hard drives, optical drives, etc. For example, the interface may be based on Serial Advanced Technology Attachment, also known as Serial ATA or SATA. In some embodiments, at least a portion of the reconfigurable I/O resources 210 is reconfigurable to function as part of the network compute subsystem 104 or as part of the server compute subsystem 108. In some embodiments, each interface in the reconfigurable I/O resources 210 may connect to a compute subsystem via the fabric bridge 202 or a steering unit. For example, in some implementations, the reconfigurable I/O resources 210 may be routed individually to the network compute subsystem 104 or to the server compute subsystem 108 using the routing fabric (e.g., fabric bridge 202) or the steering unit (not shown).

The reconfigurable last level cache resources 212 may include last level caches, such as L3 caches. In some embodiments, at least a portion of the reconfigurable last level cache resources 212 is reconfigurable to function as part of the network compute subsystem 104 or as part of the server compute subsystem 108. For example, the L3 cache may be partitioned between the network compute subsystem 104 and the server compute subsystem 108. For example, a 16 MB L3 cache may be partitioned into two 8 MB L3 caches wherein one 8 MB L3 cache can be assigned to the network compute subsystem 104 and the other 8 MB cache can be assigned to the server compute subsystem 108. In some embodiments, the L3 caches may be reconfigured at the fine grain level of 2 MB. For example, the L3 cache may be repartitioned into a 2 MB L3 cache assigned to the network compute subsystem 104 and a 14 MB L3 cache assigned to the server compute subsystem 108. In some embodiments, the reconfigurable last level cache resources 212 may be dynamically repartitioned with the reconfigurable processing cores 302 and the reconfigurable memory resources 208 between the network compute subsystem 104 and the server compute subsystem 108 based on the memory and bandwidth requirement of the configured processing cores for each compute subsystem. In some embodiments, each configurable resource in the reconfigurable last level cache resources 212 may have an interface to connect to a compute subsystem via the fabric bridge 202 or a steering unit. For example, in some implementations, the reconfigurable last level cache resources 212 may be routed individually to the network compute subsystem 104 or to the server compute subsystem 108 using the routing fabric (e.g., fabric bridge 202) or the steering unit (not shown).

The network compute subsystem cache coherent fabric 214 may represent a first physical layer fabric that can be configured to function as part of the network compute subsystem. In some implementations, the network compute subsystem cache coherent fabric 214 can connect to all the configured resources for the network compute subsystem 104 and can isolate the network compute subsystem 104 from the server compute subsystem 108 thus providing jitter and performance isolation. The network compute subsystem cache coherent fabric 214 may be configured to maintain coherency among different components of the network compute subsystem 104, for example, the reconfigurable resources assigned to the network compute subsystem 104 (e.g., reconfigurable processing cores 206, reconfigurable memory resources 208, reconfigurable I/O resources 210 and the reconfigurable last level cache resources 212), acceleration unit 216 and the shared resources subsystem 204. In some instances, the network compute subsystem cache coherent fabric 214 may represent the communication backbone of the network compute subsystem 104. In some embodiments, the network compute subsystem cache coherent fabric 214 may be configured to ensure that all shared data is coherent in the network compute subsystem 104. For example, if certain shared data is stored in two or more locations (e.g., multiple processors, multiple cores of a processor, caches, etc.), the network compute subsystem cache coherent fabric 214 may be operable to maintain consistency of the shared data in different locations. In some embodiments, the network compute subsystem cache coherent fabric 214 may include a coherency controller and a coherency directory to maintain the coherency among different components of the network compute subsystem 104.

The acceleration unit 216 may be configured to provide networking acceleration for the network compute subsystem 104. In some embodiments, the acceleration unit 216 may include different types of accelerators such as hardware accelerators, various pipelines, etc. The acceleration unit 216 may also support RDMA (Remote Direct Memory Access), crypto engines, etc. For example, the crypto engine may execute cryptographic functions in hardware, thus reducing software overhead and accelerating the execution of decryption, encryption and authentication functions related to networking. In some embodiments, the acceleration unit 216 may not be accessed by the server compute subsystem 108.

The shared resources unit 204 may include one or more resources that can be shared between the network compute subsystem 104 and the server compute subsystem 108. In some implementations, the shared resources unit 204 may be part of the management compute subsystem 110. In some embodiments, the shared resources unit 204 may include one or more peripherals that can be safely shared between the network compute subsystem 104 and the server compute subsystem 108 without causing any jitter or safety concerns. For example, the shared resources unit 204 may include a random number generator, a communication mailbox, scratchpad memory, flash memory, etc. In some embodiments, the one or more resources in the shared resources unit 204 may be individually routed to the network compute subsystem 104 and the server compute subsystem 108 using the fabric bridge 202 or a steering unit.

The server compute subsystem cache coherent fabric 218 may represent a second physical layer fabric that can be configured to function as part of the server compute subsystem 108. In some implementations, the server compute subsystem cache coherent fabric 218 can connect to all the configured resources for the server compute subsystem 108 and can isolate the server compute subsystem 108 from the network compute subsystem 104 thus providing jitter and performance isolation. The server compute subsystem cache coherent fabric 218 may be configured to maintain coherency among different components of the server compute subsystem 108, for example, the reconfigurable resources assigned to the server compute subsystem 108 (e.g., reconfigurable processing cores 206, reconfigurable memory resources 208, reconfigurable I/O resources 210 and the reconfigurable last level cache resources 212) and the shared resources subsystem 204. In some embodiments, the server compute subsystem cache coherent fabric 218 may be configured to ensure that all shared data is coherent in the server compute subsystem 108. For example, if certain shared data is stored in two or more locations (e.g., multiple processors, caches, etc.), the server compute subsystem cache coherent fabric 218 may be operable to maintain consistency of the shared data in different locations. In some embodiments, the server compute subsystem cache coherent fabric 218 may include a coherency controller and a coherency directory to maintain the coherency among different components of the server compute subsystem 108.

The fabric bridge 202 may represent the routing fabric to map each resource to a physical layer. For example, the fabric bridge 202 can map one or more resources (e.g., reconfigurable processing cores 206, reconfigurable memory resources 208, reconfigurable I/O resources 210 and reconfigurable last level cache resources 212) to a physical layer fabric that may be associated with the network compute subsystem 104 or the server compute subsystem 108. In some embodiments of the technology, multiple physical layers may exist where each physical layer can be associated with a coherent fabric for a subsystem. For example, the network compute subsystem cache coherent fabric 214 may represent a first physical layer fabric for the network compute subsystem 104 and the server compute subsystem cache coherent fabric 218 may represent a second physical layer fabric for the server compute subsystem 108. In some embodiments, each of the network compute subsystem cache coherent fabric 214 and the server compute subsystem cache coherent fabric 218 may have ports to attach to the resources. In some embodiments, the fabric bridge 202 may have ports to physically connect to each resource in the reconfigurable resources 206, e.g., via an interface of the resource. The fabric bridge 202 may be configured to map the attached resources to the ports of the respective physical layer fabric. For example, each of the network compute subsystem cache coherent fabric 214 and the server compute subsystem cache coherent fabric 218 may be implemented as a cross bar, a mesh, a ring or any other suitable implementation that can allow attaching the resources that are physically connected to the ports on the fabric bridge 202. Embodiments of the disclosed technology can allow physically isolated physical layer fabrics for each compute subsystem that can reduce the jitter and security risks for both the compute subsystems.

Figure 3:
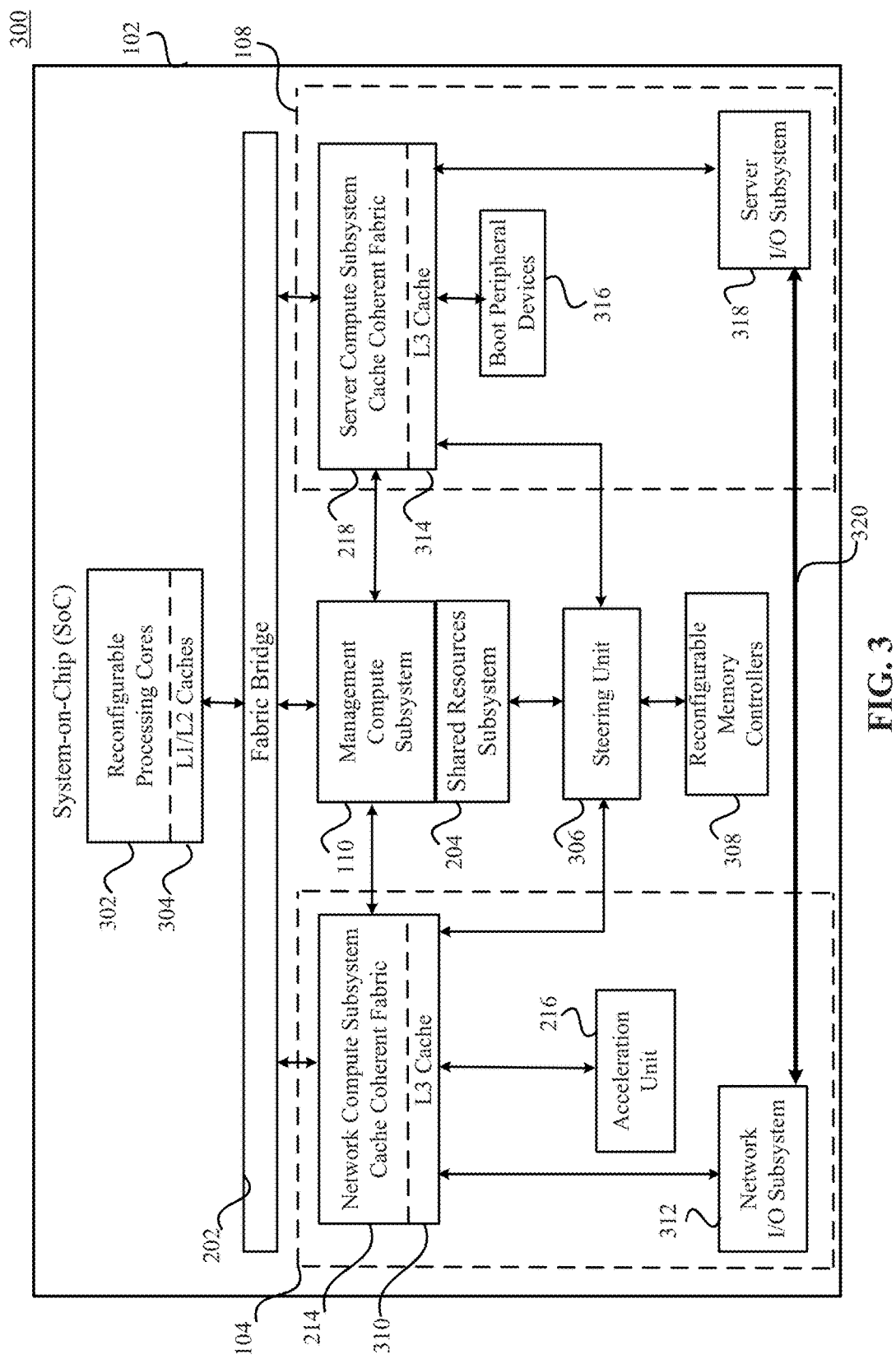
FIG. 3 illustrates a block diagram of the SoC with reconfigurable processing and memory resources according to certain embodiments of the disclosure.

FIG. 3 illustrates an exemplary SoC with reconfigurable processing and memory resources according to some embodiments of the technology.

The SoC 102 may include reconfigurable processing cores 302, L1/L2 caches 304, the fabric bridge 202, network compute subsystem 104, server compute subsystem 108, management compute subsystem 110, a steering unit 306, reconfigurable memory controllers 308 and the shared resources subsystem 204. The network compute subsystem 104 may include the network compute subsystem cache coherent fabric 214, an L3 cache 310, the acceleration unit 216 and a network I/O subsystem 312. In some embodiments, at least a portion of the reconfigurable processing cores 302, the L1/L2 caches 304 and the reconfigurable memory controllers 308 can be reconfigured to function as part of the network compute subsystem 104. The server compute subsystem 108 may include the server compute subsystem cache coherent fabric 218, an L3 cache 314, boot peripheral devices 316 and a server I/O subsystem 318. In some embodiments, at least a portion of the reconfigurable processing cores 302, the L1/L2 caches 304 and the reconfigurable memory controllers 308 can be reconfigured to function as part of the server compute subsystem 108.

The reconfigurable processing cores 302 may include a plurality of processing cores wherein each processing core may be reconfigurable to function as part of the network compute subsystem 104 or as part of the server compute subsystem 108. In some embodiments, the reconfigurable processing cores 302 may include a plurality of multi-core processors wherein each multi-core processor (e.g., 2-core processor, 3-core processor, etc.) may be reconfigurable to function as part of the network compute subsystem 104 or as part of the server compute subsystem 108. The L1/L2 caches 304 may include a plurality of L1 and/or L2 caches that can be reconfigured to function as part of the network compute subsystem 104 or as part of the server compute subsystem 108. In some embodiments, the L1/L2 caches 304 may be built into the reconfigurable processing cores 302. The L3 caches may be on the SoC 102 and each L3 cache may be shared by all the processing cores for the same subsystem. In some embodiments, the reconfigurable processing cores 302 and the L1/L2 caches 304 can be repartitioned between the network compute subsystem 104 and the server compute subsystem 108 dynamically by the management compute subsystem 110. For example, in one instance, half of the reconfigurable processing cores 302 and the corresponding L1/L2 caches 304 may be mapped to the network compute subsystem 104 and the other half may be mapped to the server compute subsystem 108. In another instance, one-third of the reconfigurable processing cores 302 and the corresponding L1/L2 caches 304 may be mapped to the network compute subsystem 104 and the two-third may be mapped to the server compute subsystem 108. In some embodiments, the L3 cache 310 and the L3 cache 314 may be dynamically repartitioned with the reconfigurable processing cores 302 and the L1/L2 caches 304 between the network compute subsystem 104 and the server compute subsystem 108 based on the memory and bandwidth requirement of the configured processing cores for each compute subsystem. In some implementations, the reconfigurable processing cores 302 and the L1/L2 caches 304 may be routed to different physical layer fabrics (e.g., network compute subsystem cache coherent fabric 214 and the server compute subsystem cache coherent fabric 218) using the fabric bridge 202 or the steering unit 306.

The network compute subsystem cache coherent fabric 214 may be configured to maintain coherency among different components of the network compute subsystem 104, for example, the reconfigured resources assigned to the network compute subsystem 104 (e.g., one or more processing cores in the reconfigurable processing cores 302 and one or more memory controllers in the reconfigurable memory controllers 308, a portion of the L1/L2 caches 304, L3 cache 310), network I/O subsystem 312, acceleration unit 216 and the shared resources subsystem 204, and also to physically isolate all the reconfigured resources assigned to the network compute subsystem 104 from the server compute subsystem 108. In some embodiments, the network compute subsystem cache coherent fabric 214 may be configured to ensure that all shared data is coherent in the network compute subsystem 104.

In some embodiments of the technology, the L3 cache 310 may be a portion of the reconfigurable last level cache resources 212, as discussed with reference to FIG. 2. For example, the L3 cache 310 may be routed to the network compute subsystem 104 using the fabric bridge 202 or the steering unit 306. In some embodiments, the L3 cache 310 may be shared by all the processing cores configured for the network compute subsystem 104, e.g., some of the reconfigurable processing cores 302.

The network I/O subsystem 312 may include one or more interfaces to communicate with various internal and external components. For example, the network I/O subsystem 312 may include an interface to communicate with the host system 112. The network I/O subsystem 312 may include an internal interface to communicate with the server compute subsystem 108, e.g., interface 320. In some embodiments, the interfaces to communicate with the host system 112 and the server compute subsystem 108 may be based on a standard interface such as PCIe. The network I/O subsystem 312 may include an interface to communicate with the network (e.g., the Internet, the Intranet), etc. In some embodiments, when the server compute subsystem 108 is not used, the interface 320 to communicate with the server compute subsystem 108 may not be utilized. In some embodiments, the server compute subsystem 108 may communicate with the host system 112 and the network via the network I/O subsystem 312, for example, via the interface 320. Referring back to FIG. 2, in some embodiments, the host interface 114 and the network interface 220 may be configured to function as part of the network compute subsystem 104, e.g., mapped to the network I/O subsystem 312 interfaces by the fabric bridge 202.

The server compute subsystem cache coherent fabric 218 may be configured to maintain coherency among different components of the server compute subsystem 108, for example, the reconfigured resources assigned to the server compute subsystem 108 (e.g., one or more processing cores in the reconfigurable processing cores 302 and one or more memory controllers in the reconfigurable memory controllers 308, a portion of the L1/L2 caches 304, L3 cache 314), server I/O subsystem 318 and the shared resources subsystem 204, and also to physically isolate all the reconfigured resources assigned to the server compute subsystem 108 from the network compute subsystem 104. In some embodiments, the server compute subsystem cache coherent fabric 218 may be configured to ensure that all shared data is coherent in the server compute subsystem 108.

In some embodiments of the technology, the L3 cache 314 may be a portion of the reconfigurable last level cache resources 212, as discussed with reference to FIG. 2. For example, the L3 cache 314 may be routed to the server compute subsystem 108 using the fabric bridge 202 or the steering unit. In some embodiments, the L3 cache 314 may be shared by all the processing cores configured for the server compute subsystem 108, e.g., some of the reconfigurable processing cores 302.

The server I/O subsystem 318 may include one or more interfaces to communicate with various internal and external components. In some embodiments, the server I/O subsystem 318 may include an interface to communicate with the host system 112. For example, the interface may be based on a predefined interface such as PCIe. The server I/O subsystem 318 may include an internal interface to communicate with the network compute subsystem 104, e.g., the interface 320. The server I/O subsystem 318 may include an interface to communicate with the network (e.g., the Internet, the Intranet), etc. In some embodiments, when all the reconfigurable resources are configured for the server compute subsystem 108, e.g., when the network compute subsystem 104 is not used, the interface 320 to communicate with the network compute subsystem 104 may not be utilized. Thus, in such instances, the server compute subsystem 108 may not communicate with the host system 112 and the network via the network compute subsystem 104, rather, the server compute subsystem 108 may utilize its interface to communicate with the host system 112 and its interface to communicate with the network via the server I/O subsystem 318. For example, referring back to FIG. 2, in some embodiments, the host interface 114 and the network interface 220 may be configured to function as part of the server compute subsystem 108, e.g., mapped to the server I/O subsystem 318 interfaces by the fabric bridge 202. In some embodiments, the server I/O subsystem 318 may also include an interface to connect to external mass storage devices such as hard drives, optical drives, etc. For example, the interface may be based on Serial Advanced Technology Attachment, also known as Serial ATA or SATA.

The boot peripheral devices 316 may include one or more peripherals for the server compute subsystem 108. For example, the boot peripheral devices 316 may include a boot ROM, EEPROM or a flash memory. In some embodiments, one of the boot peripheral devices 316 may include the BIOS software to bootstrap an operating system for the server compute subsystem 108.

The management compute subsystem 110 may be configured to manage various compute subsystems of the SoC 102. The management compute subsystem 110 may also be configured to manage the resources associated with different compute subsystems. For example, the management compute subsystem 110 may reconfigure the reconfigurable processing cores 302, L1/L2 caches 304 and the reconfigurable memory controllers 308 to repartition the processing and memory resources between the network compute subsystem 104 and the server compute subsystem 108. In some embodiments, the management compute subsystem 110 may determine the reconfiguration of the processing and memory resources based on a software or hardware configuration.

The reconfigurable memory controllers 308 may include one or more memory controllers. The reconfigurable memory controllers 308 may include DDR controllers, DDR2 controllers or any suitable controller and may be used to manage the access to an external memory, e.g., via one or more memory channels (not shown). In some embodiments, one or more of the reconfigurable memory controllers 308 may be configured to function as part of the network compute subsystem 104 or the server compute subsystem 108. For example, in some implementations, the reconfigurable memory controllers 308 may be routed to different physical layer fabrics (e.g., network compute subsystem cache coherent fabric 214 and the server compute subsystem cache coherent fabric 218) using the fabric bridge 202 or the steering unit 306.

The shared resources subsystem 204 may include one or more resources that can be shared between the network compute subsystem 104 and the server compute subsystem 108. The shared resource subsystem 318 may be communicatively coupled to both the network compute subsystem cache coherent fabric 214 and the server compute subsystem cache coherent fabric 218.

The steering unit 306 may be configured to steer each of the memory controllers in the reconfigurable memory controllers 308 to the network compute subsystem 104 (e.g., via the network compute subsystem cache coherent fabric 214) or to the server compute subsystem 108 (e.g., via the server compute subsystem cache coherent fabric 218). In some embodiments, the steering unit 306 may include multiplexers, de-multiplexers or any other suitable implementation to perform the steering. For example, in some instances, the steering unit 306 may steer or route the memory data and control signals to either the network compute subsystem 104 or to the server compute subsystem 108 from the reconfigurable memory controllers 308, and in some other instances, may route the memory data and control signals from either the network compute subsystem 104 or the server compute subsystem 108 to the reconfigurable memory controllers 308. In some embodiments, the steering unit 306 may determine the steering of the reconfigurable memory controllers 308 based on the partitioning of the reconfigurable processing cores 302 and the required memory bandwidth. In some embodiments, the steering unit 306 may be integrated with the reconfigurable memory controllers 308 to perform the steering of each memory controller in the reconfigurable memory controllers 308 to the either compute subsystem.

In some implementations, the steering unit 306 may also be configured to steer the reconfigured processing cores 302 and L1/L2 caches 304 to the network compute subsystem 104 (e.g., via the network compute subsystem cache coherent fabric 214) or to the server compute subsystem 108 (e.g., via the server compute subsystem cache coherent fabric 218). In some implementations, the steering unit 306 may also be configured to steer one or more shared resources in the shared resources subsystem 204 to the network compute subsystem 104 and to the server compute subsystem 108.

Figure 4:
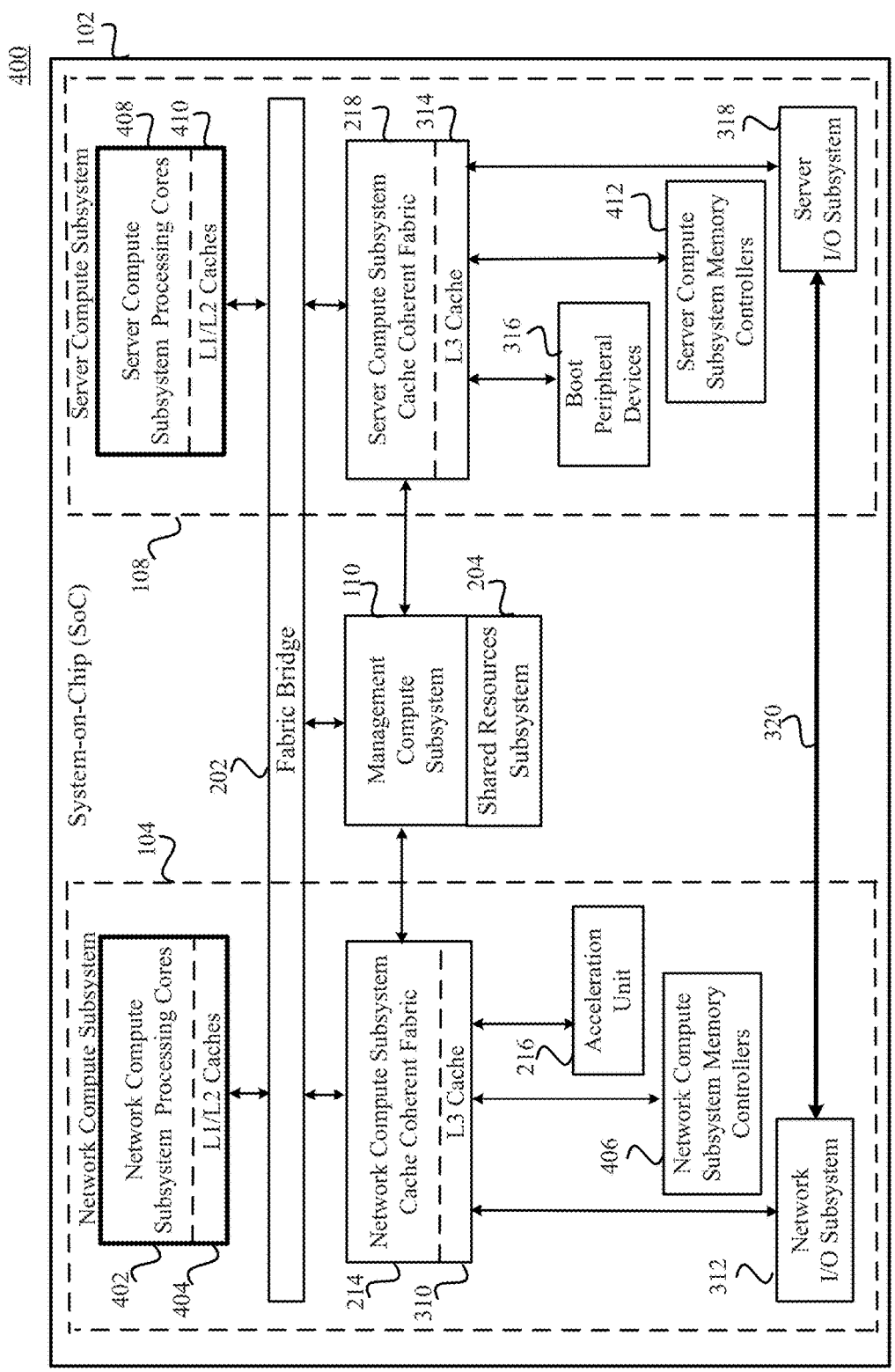
FIG. 4 illustrates a detailed block diagram of the SoC according to certain embodiments of the disclosure.

FIG. 4 illustrates an exemplary block diagram of the SoC 402 including reconfigured resources in some embodiments of the technology. For example, with reference to FIG. 3, the reconfigurable processing cores 302, L1/L2 caches 304 and the reconfigurable memory controllers 308 have been reconfigured and repartitioned between the network compute subsystem 104 and the server compute subsystem 108. For example, the configuration illustrated in FIG. 4 may be a default configuration at power on.

FIG. 4 illustrates the SoC 102 including the network compute subsystem 104, server compute subsystem 108, fabric bridge 202, management compute subsystem 110 and the shared resources subsystem 204. The network compute subsystem 104 may include one or more reconfigured resources such as network compute subsystem processing cores 402, L1/L2 caches 404, and network compute subsystem memory controllers 406 in addition to the network compute subsystem cache coherent fabric 214, L3 cache 310, network I/O subsystem 312 and the acceleration unit 216 as discussed with reference to FIG. 3. The server compute subsystem 108 may include one or more reconfigured resources such as server compute subsystem processing cores 408, L1/L2 caches 410, and network compute subsystem memory controllers 412 in addition to the server compute subsystem cache coherent fabric 218, L3 cache 314, server I/O subsystem 318 and the boot peripheral devices 316 as discussed with reference to FIG. 3.

The network compute subsystem processing cores 402 may include one or more processing cores that have been configured to function as part of the network compute subsystem 104, e.g., by the management compute subsystem 110. In some embodiments, the network compute subsystem processing cores 402 may have been partitioned at the grain level of 2 processing cores. In some embodiments, the L1/L2 caches 404 may have been partitioned such that one L1/L2 cache can be shared by each multi-core processor (e.g., 2 core processor) in the network compute subsystem processing cores 402.

The network compute subsystem memory controllers 406 may include one or more memory controllers that have been reconfigured to function as part of the network compute subsystem 104, e.g., by the management compute subsystem 110. Referring back to FIG. 3, the network compute subsystem memory controllers 406 may include one or more memory controllers in the reconfigurable memory controllers 308 that have been steered by the steering unit 306 to the network compute subsystem 104.

The server compute subsystem processing cores 408 may include one or more multi-core processors that have been configured to function as part of the server compute subsystem 108, e.g., by the management compute subsystem 110. In some embodiments, the server compute subsystem processing cores 408 may have been partitioned at the grain level of 2 processing cores. In some embodiments, the L1/L2 caches 410 may have been partitioned such that one L1/L2 cache can be shared by each multi-core processor (e.g., 2 core processor) in the server compute subsystem processing cores 408.

The server compute subsystem memory controllers 412 may include one or more memory controllers that have been reconfigured to function as part of the server compute subsystem 108, e.g., by the management compute subsystem 110. Referring back to FIG. 3, the server compute subsystem memory controllers 412 may include one or more memory controllers in the reconfigurable memory controllers 308 that have been steered by the steering unit 306 to server compute subsystem 108.

The network compute subsystem cache coherent fabric 214 may provide reduced jitter and security concerns by isolating all the configured resources for the network compute subsystem 104 to a first physical layer and the server compute subsystem cache coherent fabric 218 may provide reduced jitter and security concerns by isolating all the configured resources for the server compute subsystem 108 to a second physical layer.

In some embodiments, at boot time, the reconfigurable processing and memory resources may be partitioned into the exemplary configuration as illustrated in FIG. 4. In some instances, if the server compute subsystem 108 is configured to provide high performance compute services but the computing resources are not fully utilized (e.g. not all the slots on the virtual servers are rented out), the management compute subsystem 110 may dynamically shift some of the processing and memory resources from the server compute subsystem 108 to the network compute subsystem 104. Similarly, in some other instances, if the server compute subsystem 108 is configured to provide low performance compute services but all the resources are fully utilized (e.g. all the slots on the virtual servers are rented out), the management compute subsystem 110 may dynamically shift some of the processing and memory resources from the network compute subsystem 104 to the server compute subsystem 108 for better utilization of the resources.

Figure 5:
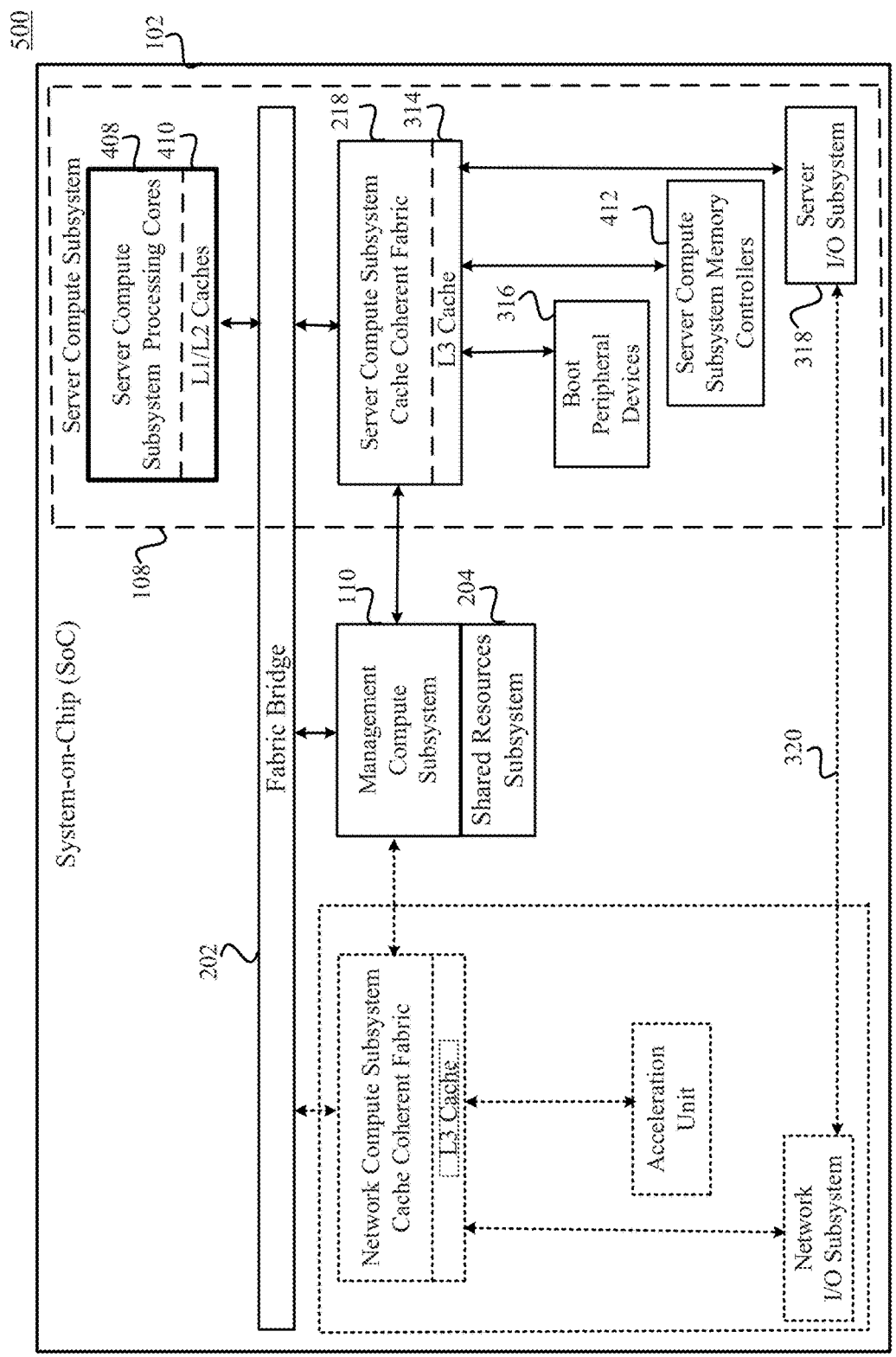
FIG. 5 illustrates a detailed block diagram of the SoC including a server compute subsystem according to certain embodiments of the disclosure.

FIG. 5 illustrates an exemplary block diagram of the SoC 102 with server only configuration in some embodiments of the technology. As discussed previously, in some instances, the management subsystem 110 may repartition all the reconfigurable resources to function as part of the server compute subsystem 108, e.g., when the functionality of the network compute subsystem 104 is not utilized. For example, referring back to FIG. 3, the reconfigurable processing cores 302, L1/L2 caches 304 and the reconfigurable memory controllers 308 have been reconfigured to function as part of the server compute subsystem 108. In some instances, this reconfiguration of resources may occur at boot-up time.

FIG. 5 illustrates the SoC 102 including the server compute subsystem 108, fabric bridge 202, management compute subsystem 110 and the shared resources subsystem 204. The network compute subsystem 104, as discussed with reference to FIG. 4, is not utilized in this embodiment. For example, in some embodiments, the SoC 102 may be configured to provide server only functionalities and therefore the network functionalities may not be used.

The server compute subsystem 108 may include similar components as discussed in FIG. 4. The server compute subsystem processing cores 408 and the L1/L2 caches 410 may have been configured to function as part of the server compute subsystem 108, e.g., by the management compute subsystem 110. The server compute subsystem memory controllers 412 may include some or all the reconfigurable memory controllers 308 that may have been steered by the steering unit 306 to the server compute subsystem 108.

The interface 320 may not be utilized by the server compute subsystem 108 to communicate with the host system 112 and with the network via the network compute subsystem 104. In some embodiments of the technology, the server compute subsystem 108 may communicate with the host system 112 and the network using the server I/O subsystem 318. For example, referring back to FIG. 2, the host interface 114 and the network interface 220 may be reconfigured to function as part of the server compute subsystem 108, e.g., by mapping the server I/O subsystem 318 interfaces to the host interface 114 and the network interface 220 by the fabric bridge 202.

Figure 6:
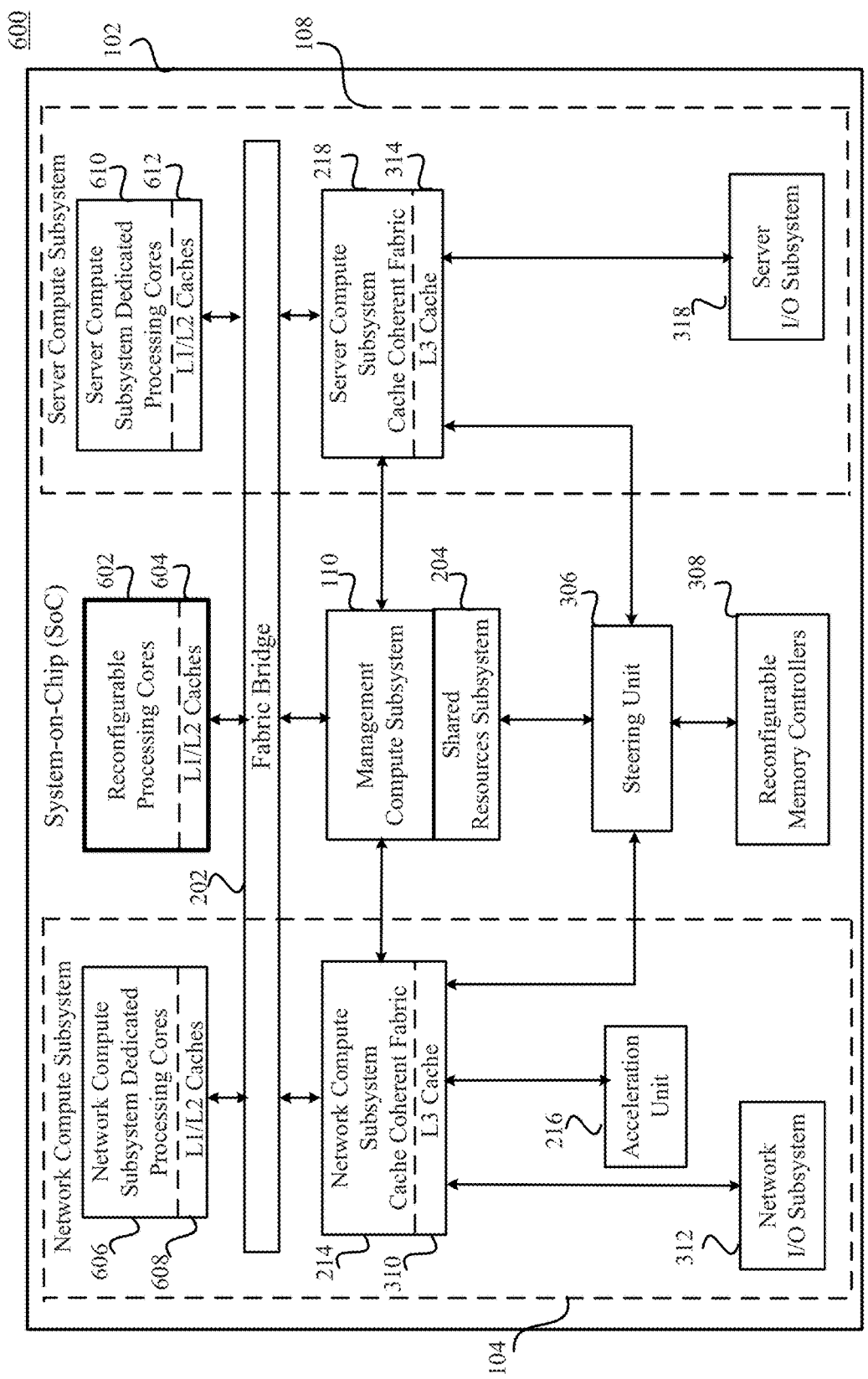
FIG. 6 illustrates a detailed block diagram of the SoC including reconfigurable processing resources in addition to the dedicated resources for each of the network and server compute subsystems according to certain embodiments of the disclosure.

FIG. 6 illustrates an exemplary block diagram of the SoC 102, in one embodiment of the technology. Generally, the SoC can include a flexible pool of resources that can be configured dynamically to function as part of a network compute subsystem or as part of a server compute subsystem. The network compute subsystem and the server compute subsystem can each also include dedicated processing and memory resources.

The SoC 102 may include reconfigurable processing cores 602 and L1/L2 caches 604 in addition to the network compute subsystem 104, server compute subsystem 108, fabric bridge 202, management compute subsystem 110, steering unit 306, reconfigurable memory controllers 308 and the shared resources subsystem 204, as discussed with reference to FIG. 3. The network compute subsystem 104 may include network compute subsystem dedicated processing cores 608 and L1/L2 caches 610 in addition to a plurality of components as discussed in FIG. 4. For example, the network compute subsystem 104 may also include the network compute subsystem cache coherent fabric 214, L3 cache 310, network I/O subsystem 312 and the acceleration unit 216. The server compute subsystem 108 may include server compute subsystem dedicated processing cores 612 and L1/L2 caches 614 in addition to a plurality of components as discussed in FIG. 4. For example, the server compute subsystem 108 may also include the server compute subsystem cache coherent fabric 218, L3 cache 314 and the server I/O subsystem 318.

The reconfigurable processing cores 602 may include a plurality of processing cores that can be configured dynamically to function as part of the network compute subsystem 104 or as part of the server compute subsystem 108. The L1/L2 caches 604 may include a plurality of L1/L2 caches that can be configured dynamically to function as part of the network compute subsystem 104 or as part of the server compute subsystem 108. In some embodiments, each of the L1/L2 caches 604 may be shared by one or more processing cores. For example, the management compute subsystem 110 may determine based on work load demand to flex each of the processing cores and L1/L2 caches to either the network compute subsystem 104 or to the server compute subsystem 108. As an example, in one embodiment, each of the network compute subsystem dedicated processing cores 606, server compute subsystem dedicated processing cores 610 and the reconfigurable processing cores 602 may include eight, 2-core processors. In embodiments of the technology, one or more of the reconfigurable processing cores 602 can be flexed either to the network compute subsystem 104 or to the server compute subsystem 108. For example, in one instance, the management compute subsystem 110 may determine that at a certain time the server compute subsystem 108 may be providing high performance compute services as compared to the network compute subsystem 104. Thus, in this instance, two, 2-core processors from the reconfigurable processing cores 602 may be mapped to the network compute subsystem 104 and six, 2-core processors from the reconfigurable processing cores 602 may be mapped to the server compute subsystem 108. Similarly, if the management compute subsystem 110 determines that at a certain time the network compute subsystem 104 may be providing high performance networking services as compared to the server compute subsystem 108. Thus, in this instance, two, 2-core processors from the reconfigurable processing cores 602 may be mapped to the server compute subsystem 108 and six, 2-core processors from the reconfigurable processing cores 602 may be mapped to the network compute subsystem 104. In some embodiments, all or none of the reconfigurable processing cores 602 may be mapped to the either compute subsystem depending on the work load demand.

The steering unit 306 may be configured to dynamically steer one or more memory controllers in the reconfigurable memory controllers 308 to the network compute subsystem 104 or to the server compute subsystem 108. For example, the management compute subsystem 110 can configure the reconfigurable memory controllers 308 to function as part of the network compute subsystem 104 or as part of the server compute subsystem 108. In some embodiments, the management compute subsystem 110 may be configured to provide control signals to the steering unit 306 to steer the reconfigurable memory controllers 308 to the network compute subsystem 104 or to the server compute subsystem 108. In some embodiments, the steering unit may steer the reconfigurable memory controllers 308 to the network compute subsystem 104 or to the server compute subsystem 108 to match the bandwidth and memory capacity of the flexed reconfigurable processing cores 602.

In some embodiments, the steering unit 306 may also be used to steer the reconfigured processing cores 302 and L1/L2 caches 304 to the network compute subsystem 104 (e.g., via the network compute subsystem cache coherent fabric 214) or to the server compute subsystem 108 (e.g., via the server compute subsystem cache coherent fabric 218).

The network compute subsystem cache coherent fabric 214 may provide reduced jitter and security concerns by isolating all the configured resources for the network compute subsystem 104 to a first physical layer and the server compute subsystem cache coherent fabric 218 may provide reduced jitter and security concerns by isolating all the configured resources for the server compute subsystem 108 to a second physical layer.

Figure 7:
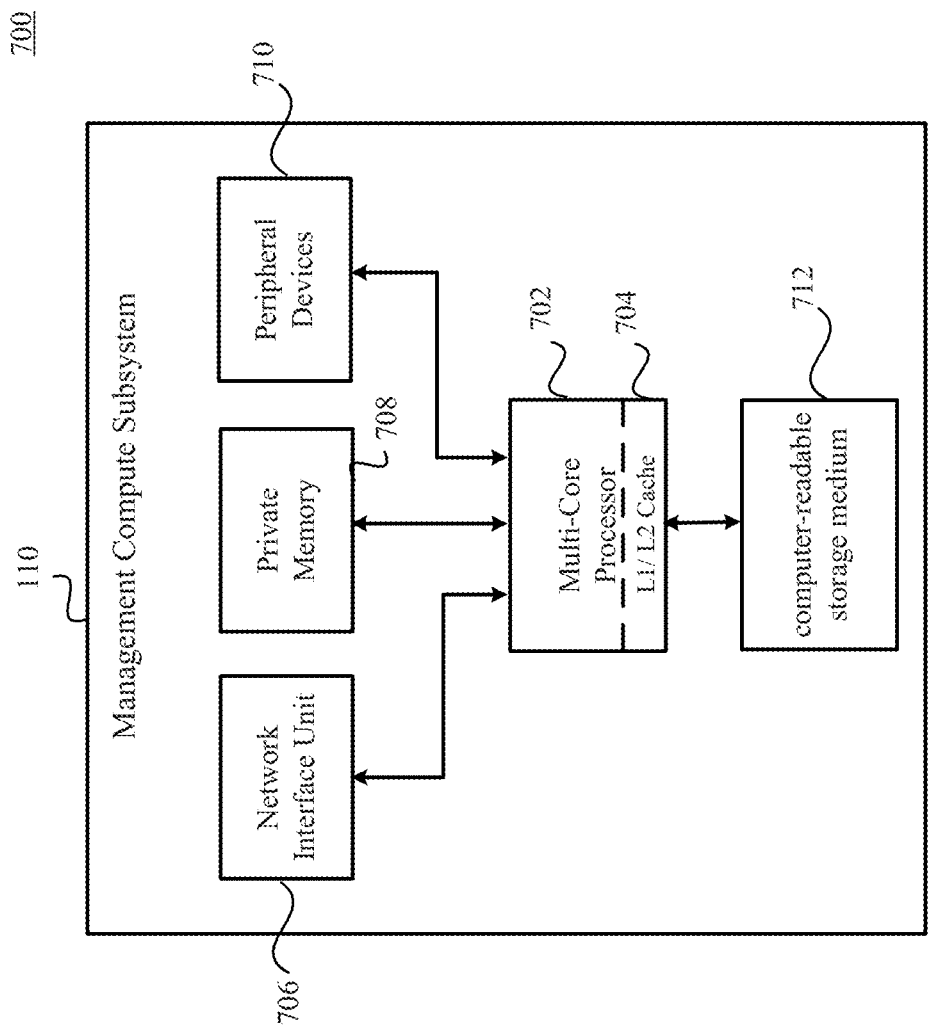
FIG. 7 illustrates a block diagram of the management compute subsystem according to certain embodiments of the disclosure.

FIG. 7 illustrates a block diagram for the management compute subsystem 110, according to certain embodiments of the technology. The management compute subsystem 110 may include a multi-core processor 702, an L1/L2 cache 704, a network interface unit 706, private memory 708, peripheral devices 710 and a computer-readable storage medium 712.

The multi-core processor 702 may include two or more processor cores such as A57 by ARM®. In some embodiments, a single core processor may be used in place of the multi-core processor 702. The L1/L2 cache 704 may be internal or external to the multi-core processor 702 and may be shared by all the processor cores. The multi-core processor 702 may be configured to execute a plurality of instructions that may be stored on the computer-readable storage medium 712. For example, the computer-readable medium may include instructions to perform fine-grained dynamic repartitioning of the configurable resources between the network compute subsystem 104 and the server compute subsystem 108. The computer-readable storage medium 712 may be non-transitory. In some embodiments, the computer-readable storage media may include but are not limited to, parameter random access memory (PRAM), SRAM, DRAM, RAM, read only memory (ROM), electrically erasable programmable read-only memory (EEPROM), flash memory or other memory technology, compact disc (CD)-ROM, digital video disk (DVD) or other optical storage, magnetic cassettes, magnetic tape, magnetic disk storage or other magnetic storage devices, or any other medium which can be used to store the desired information and which can be accessed by multi-core processor 702. In some embodiments, the computer-readable storage medium 712 may be part of the peripheral devices 710. The L1/L2 cache 704 may be data cache for temporary storage of data.

The network interface unit 706 may allow the management compute subsystem 110 to connect to a network. For example, the network interface unit 706 may include an Ethernet MAC (Medium Access Control) that can enable the management compute subsystem 110 to connect to a network such as the Ethernet. In some instances, the Ethernet MAC may provide an Ethernet port to interface to a PHY (physical layer) device for connecting to a network. In some embodiments, the management compute subsystem 110 can communicate with an external entity or system over the network to determine the work load of a virtual server instance in order to configure the processing and memory resources dynamically.

The private memory 708 may include memory for private use of the management compute subsystem 110. The private memory 708 may include volatile memory such as random access memory (e.g., SRAM or DRAM). For example, the management compute subsystem 110 may use the private memory 708 for temporary storage of data.

The peripheral devices 710 may include private peripheral devices for the management compute subsystem 110. In some embodiments, some of the private peripheral devices 710 may include devices for reboot and power management of different subsystems of the SoC 202. For example, the peripheral devices 710 may include a trusted management module including boot firmware that can execute at power-on to establish a root-of-trust before powering on other subsystems. In some embodiments, power management may be provided through voltage manipulation, clock manipulation or any other suitable method.

In some embodiments, the management compute subsystem 110 may be configured to be the first to run upon a cold power on of the entire SoC 202. In some instances, the management compute subsystem 110 may be powered on first to establish a root-of-trust for the other subsystems before they are powered on. For example, the boot processes for the network compute subsystem 104 and the server compute subsystem 108 may be considered hierarchically under the core boot for the management compute subsystem 110. In some embodiments, the software that would subsequently run on the network compute subsystem 104 and the server compute subsystem 108 may have been authenticated by the management compute subsystem 110 as having been signed using a private key associated with the host system 112 or a particular service provided by the host system 112. This can allow both the network compute subsystem 104 and the server compute subsystem 108 processes to boot via trusted and independent boot loaders.

In some embodiments, the management compute subsystem 110 may configure the resources for the network compute subsystem 104 and the server compute subsystem 108 after boot-up. For example, the management compute subsystem 110 may reconfigure at least some of the resources at boot-up to reconfigure the SoC 102 as a network only system or as a server only system by mapping all the processing and memory resources to the network compute subsystem 104 or to the server compute subsystem 108 respectively. In some embodiments, the management compute subsystem 110 may be reset/rebooted with a separate reset line without affecting the live operation of both the network compute subsystem 104 and the server compute subsystem 108.

Figure 8:
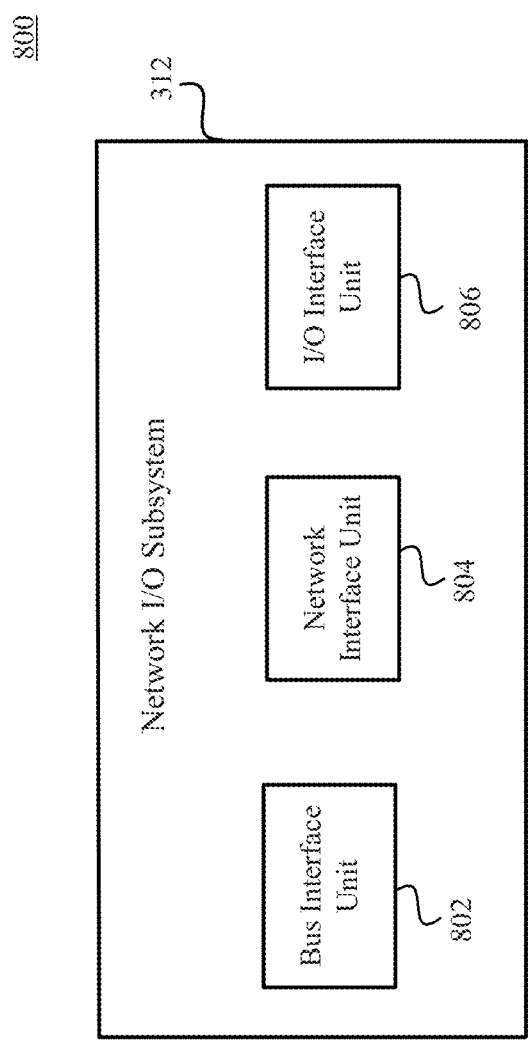
FIG. 8 illustrates a block diagram of a network I/O subsystem according to certain embodiments of the disclosure.

FIG. 8 illustrates some components of the network I/O subsystem 324. The network I/O subsystem 312 may include a bus interface unit 802, a network interface unit 804 and an I/O interface unit 806.

The bus interface unit 802 may include one or more bus interfaces for communication with internal or external components. For example, the bus interface unit 802 may include a first interface to connect with the host system 112, e.g., by mapping the first interface to the host interface 114 by the fabric bridge 202. The bus interface unit 802 may include a second interface to connect with the server compute subsystem 108, e.g., interface 320. In some embodiments, the first interface and the second interface may be PCIe interfaces. For example, the bus interface unit 802 may include one or more PCIe ports to connect to other PCIe ports. The bus interface unit 802 may include a Root Complex (RC) port and an EndPoint port (EP). Referring back to FIG. 3, the network compute subsystem 104 may communicate with the server compute subsystem 108 via a PCIe port in the network I/O subsystem 312 and a PCIe port in the server I/O subsystem 318 using the interface 320. Similarly, the network compute subsystem 104 may communicate with the host system 112 via a PCIe port in the network I/O subsystem 312 and a PCIe port in the host system 112 using the interface 114.

The network interface unit 804 may include a third interface to connect to a network, for example, by mapping the third interface to the network interface 220 by the fabric bridge 202. In some embodiments, the network interface unit 804 may include one or more Ethernet MACs (e.g., 10/25/40/50 Gb/sec) to connect to an Ethernet network. In some instances, the Ethernet MACs may provide Ethernet ports to interface to a PHY (physical layer) device for connecting to a network. Referring back to FIG. 3, the one or more Ethernet MACs may connect to the network compute subsystem coherent interconnect network 320.

The I/O interface unit 806 may include one or more interfaces for I/O connectivity. For example, the I/O interface unit 806 may be configured to interface with pins or interconnects for network connectivity (e.g., Ethernet, etc.) and for the external bus interface (e.g., PCIe). In some embodiments, the I/O interface unit 806 may include I/O multiplexers to select one or more input/output signals. In some embodiments, the I/O multiplexers may include a SERDES (Serialize-De-serialize) interface for the I/O.

Figure 9:
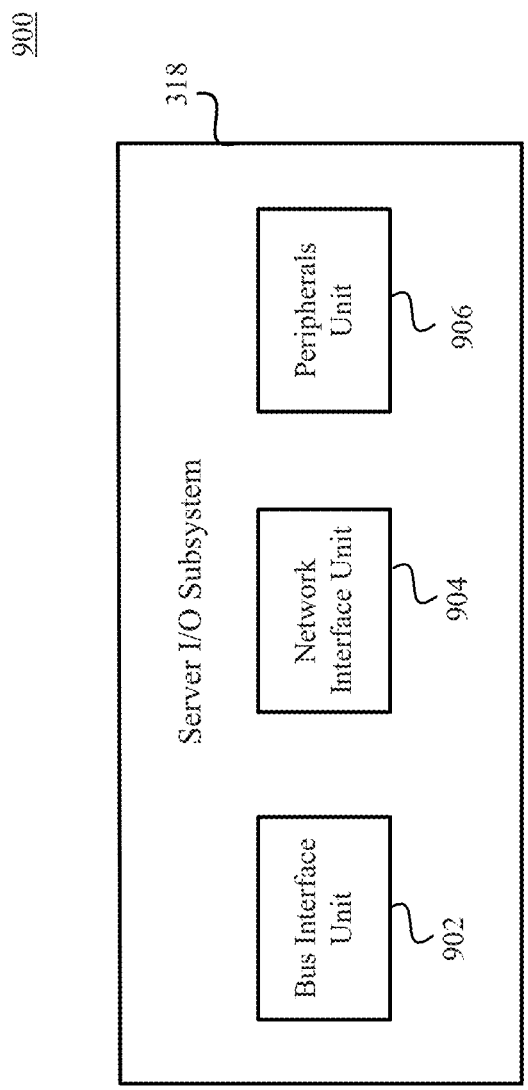
FIG. 9 illustrates a block diagram of a server I/O subsystem according to certain embodiments of the disclosure.

FIG. 9 illustrates some components of the server I/O subsystem 318. The server I/O subsystem 318 may include a bus interface unit 902, a network interface unit 904 and a peripherals unit 906.

The bus interface unit 902 may include one or more bus interfaces for communication with internal or external components. In some embodiments, the bus interface unit 902 may include a first interface to connect with the host system 112, e.g., by mapping the first interface to the host interface 114 by the fabric bridge 202 when the network compute subsystem 104 is not used. For example, in some embodiments, when both network compute subsystem 104 and server compute subsystem 108 are functional, the server compute subsystem 108 may communicate with the host system 112 via the network compute subsystem 104. The bus interface unit 902 may also include a second interface to connect with the network compute subsystem 104, e.g., interface 320. In some embodiments, the first interface and the second interface may be PCIe interfaces. For example, the bus interface unit 902 may include one or more PCIe ports to connect to other PCIe ports. The bus interface unit 902 may include a Root Complex (RC) port and an EndPoint port (EP). Referring back to FIG. 3, the server compute subsystem 308 may communicate with the network compute subsystem 104 via a PCIe port in the server I/O subsystem 318 and a PCIe port in the network I/O subsystem 312 using the interface 320. Similarly, the server compute subsystem 108 may communicate with the host system 112 via a PCIe port in the server I/O subsystem 318 and a PCIe port in the host system 112 using the interface 114. In some embodiments, the bus interface unit 902 may also include an interface to connect to external mass storage devices such as hard drives, optical drives, etc. For example, the interface may be based on Serial Advanced Technology Attachment, also known as Serial ATA or SATA.

The network interface unit 904 may include a third interface to connect to a network, e.g., by mapping the third interface to the network interface 220 by the fabric bridge 202 when the network compute subsystem 104 is not used. For example, when both network compute subsystem 104 and server compute subsystem 108 are functional, the server compute subsystem 108 may communicate with the network via the network compute subsystem 104. In some embodiments, the network interface unit 904 may include one or more Ethernet MACs (e.g., 10/25/40/50 Gb/sec) to connect to an Ethernet network. In some instances, the Ethernet MACs may provide Ethernet ports to interface to a PHY (physical layer) device for connecting to a network. Referring back to FIG. 3, the one or more Ethernet MACs may connect to the server compute subsystem coherent interconnect network 320.

The peripherals unit 906 may include one or more peripheral units for boot management. For example, the peripherals unit 906 may include general purpose input/output, low speed boot peripherals, etc.

Figure 10:
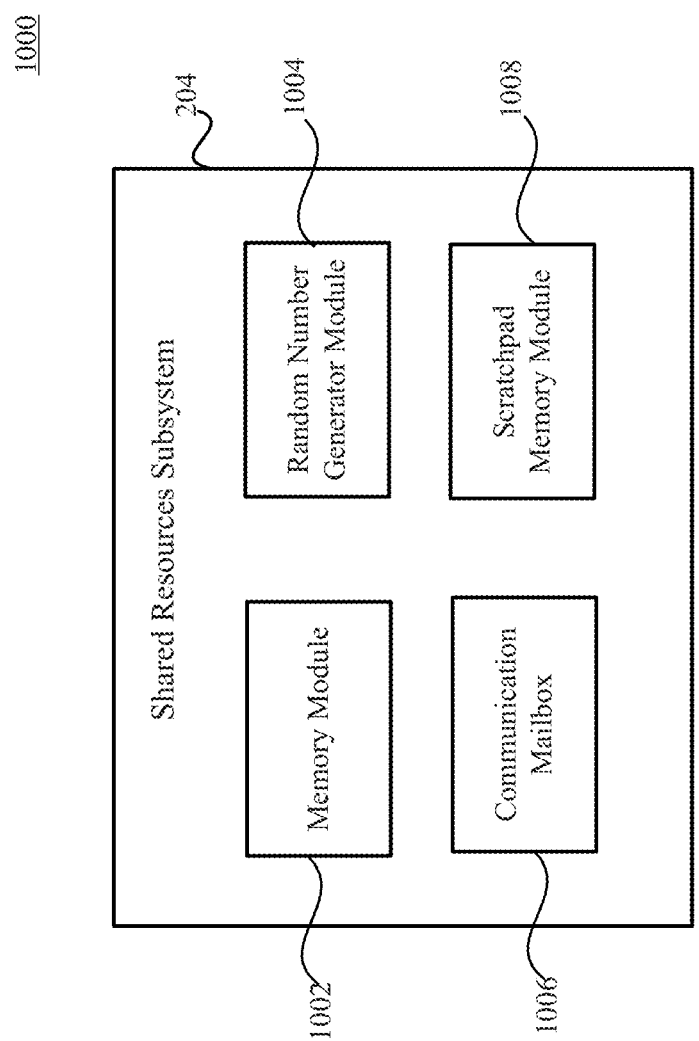
FIG. 10 illustrates a block diagram of the shared resources unit according to certain embodiments of the disclosure.

FIG. 10 illustrates some components of the shared resources subsystem 204. In embodiments of the technology, the shared resources subsystem 204 may include components that may not include process states. The shared resources subsystem 204 may include a memory module 1002, a random generator module 1004, a communication mailbox 1006 and a scratchpad memory module 1008.

The memory module 1002 may include non-volatile memory storage such as flash memory. For example, the memory module 1002 may include an embedded multimedia controller (eMMC) or secure digital (SD) to provide low level flash memory management. In some embodiments, the memory module 1002 may be used to store control code e.g., BIOS (Basic Input/Output System), boot loader, etc. For example, the memory module 1002 may include code that may be shared by both the subsystems. In some embodiments, the memory module 1002 may be used to store the default configuration of various configurable resources at power up.

The random generator module 1004 may be configured to generate a random sequence of numbers or symbols. For example, the random numbers may be used for cryptographic applications such as encryption of data or any such applications. In some embodiments, the random generator module 1004 may be used to generate a random number or sequence that may be used by the management compute subsystem 110 for authentication of each compute subsystem before powering up each compute subsystem after power on or reboot.

The communication mailbox 1006 may be used to facilitate communication among different processes associated with the two subsystems. For example, the communication mailbox 1006 may be used as an inter-process communication module for exchange of data for various functions such as message passing, synchronization, shared memory and remote procedure calls (RPC).

The scratchpad memory module 1008 may be used for temporary storage of data that may be used by both the subsystems. In some embodiments, the scratchpad memory module 1008 may include a high speed memory (e.g., 2 MB SRAM) to store small amounts of data for rapid retrieval, e.g., instructions or intermediate values.

Figure 11:
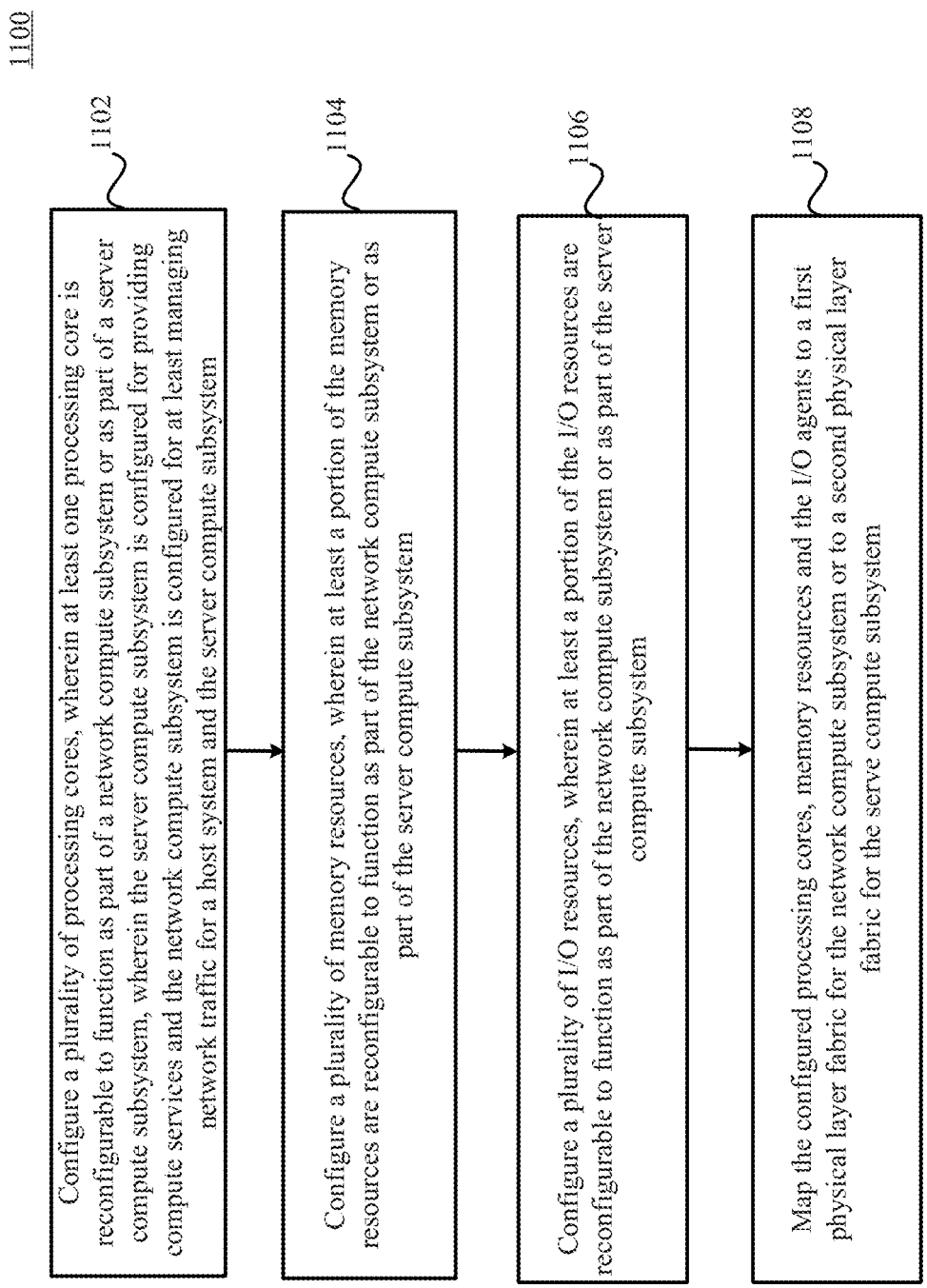
FIG. 11 illustrates a flow diagram according to certain embodiments of the disclosure.

FIG. 11 illustrates a flow diagram 1100 according to one or more aspects of the technology. Some or all of the process 1100 (or any other processes described herein, or variations and/or combinations thereof) may be performed under the control of one or more computer systems configured with executable instructions and may be implemented as code (e.g., firmware, executable instructions, one or more computer programs or one or more applications) executing collectively on one or more processors, or by hardware or combinations thereof. The code may be stored on a computer-readable storage medium, for example, in the form of a computer program that may include a plurality of instructions executable by one or more processors. The computer-readable storage medium may be non-transitory.

At step 1102, a plurality of processing cores may be configured, wherein at least one processing core is reconfigurable to function as part of a network compute subsystem or as part of a server compute subsystem, wherein the server compute subsystem is configured for providing compute services and the network compute subsystem is configured for at least managing network traffic for a host system and the server compute subsystem. For example, referring back to FIG. 2, at least one processing core in the reconfigurable processing cores 206 may be configured by the management compute subsystem 204 to function as part of the network compute subsystem 104 or the server compute subsystem 108. The management compute subsystem 110 may configure the reconfigurable processing cores 206 at power up with a default configuration. In embodiments of the technology, the management compute subsystem 110 may be capable to dynamically repartition the reconfigurable processing cores 206 between the network compute subsystem 104 and the server compute subsystem 108, for example, depending on the work load demand. Referring back to FIG. 4, in one embodiment, the reconfigurable processing cores 206 are partitioned between the network compute subsystem 104 and the server compute subsystem 108 as network compute subsystem processing cores 402 and the server compute subsystem processing cores 408 respectively. Referring back to FIG. 5, in another embodiment, the reconfigurable processing cores 206 are configured only for the server compute subsystem 108 as the network compute subsystem 104 is not used.

At step 1104, a plurality of memory resources (e.g., L1 caches, L2 caches, memory controllers, etc.) may be configured, wherein at least a portion of the memory resources are reconfigurable to function as part of a network compute subsystem or as part of a server compute subsystem. For example, referring back to FIG. 2, the reconfigurable memory resources 208 may be configured by the management compute subsystem 204 to function as part of the network compute subsystem 104 or the server compute subsystem 108. The management compute subsystem 110 may configure the reconfigurable memory resources 208 at power up with a default configuration. For example, the management compute subsystem 110 may configure the cache hierarchies (e.g., L1, L2 and L3 caches) and the memory controllers for each compute subsystem. In embodiments of the technology, the management compute subsystem 110 may be capable to dynamically repartition the reconfigurable memory resources 208 between the network compute subsystem 104 and the server compute subsystem 108, for example, depending on the work load demand. Referring back to FIG. 4, in one embodiment, the reconfigurable memory resources 208 are partitioned between the network compute subsystem 104 and the server compute subsystem 108. Referring back to FIG. 5, in another embodiment, the reconfigurable memory resources 208 are configured only for the server compute subsystem 108 as the network compute subsystem 104 is not used.

At step 1106, a plurality of I/O resources may be configured, wherein at least a portion of the I/O resources are reconfigurable to function as part of a network compute subsystem or as part of a server compute subsystem. For example, referring back to FIG. 2, the reconfigurable I/O resources 210 may be configured by the management compute subsystem 204 to function as part of the network compute subsystem 104 or the server compute subsystem 108. The management compute subsystem 110 may configure the reconfigurable I/O resources 210 at power up with a default configuration. For example, the management compute subsystem 110 may configure the bus and network interfaces for each compute subsystem. In embodiments of the technology, the management compute subsystem 110 may dynamically repartition the reconfigurable I/O resources 210 between the network compute subsystem 104 and the server compute subsystem 108, for example, depending on the work load demand. In one instance, referring back to FIG. 4, the reconfigurable I/O resources 210 are partitioned between the network compute subsystem 104 and the server compute subsystem 108. For example, the server compute subsystem 108 may communicate with the host system 112 and the network via the host and network interfaces of the network I/O subsystem 312 using interface 320. In another instance, referring back to FIG. 5, the reconfigurable I/O resources 210 are configured only for the server compute subsystem 108 as the network compute subsystem 104 is not used. For example, the server compute subsystem 108 may communicate with the host system 112 and the network via the host and network interfaces of the server I/O subsystem 318.

At step 1108, the configured processing cores, memory resources and the I/O resources can be mapped to a first physical layer fabric for the network compute subsystem or a second physical layer fabric for the server compute subsystem using a fabric bridge, wherein the first physical layer fabric and the second physical layer fabric are physically isolated from each other. For example, referring back to FIG. 2, the fabric bridge 202 can map the reconfigurable processing cores 206, reconfigurable memory resources 208 and the reconfigurable I/O resources 210 to either the network compute subsystem 104 or to the server compute subsystem 108. For example, in some embodiments, the fabric bridge 202 can physically connect each configured resources attached to its ports to the ports of the network compute subsystem cache coherent fabric 214 or to the server compute subsystem cache coherent fabric 218. In some implementations, the configured processing cores, memory resources and the I/O resources can be steered to the network compute subsystem 104 or to the server compute subsystem 108 using the steering unit 306. However, other implementations are possible.

Embodiments of the disclosed technology can provide the flexibility of fine-grained dynamic partitioning of various compute resources among different compute subsystems on a SoC. The ability to reconfigure each resource dynamically can allow efficient utilization of resources, thus meeting work load demands without compromising the performance.

Figure 12:
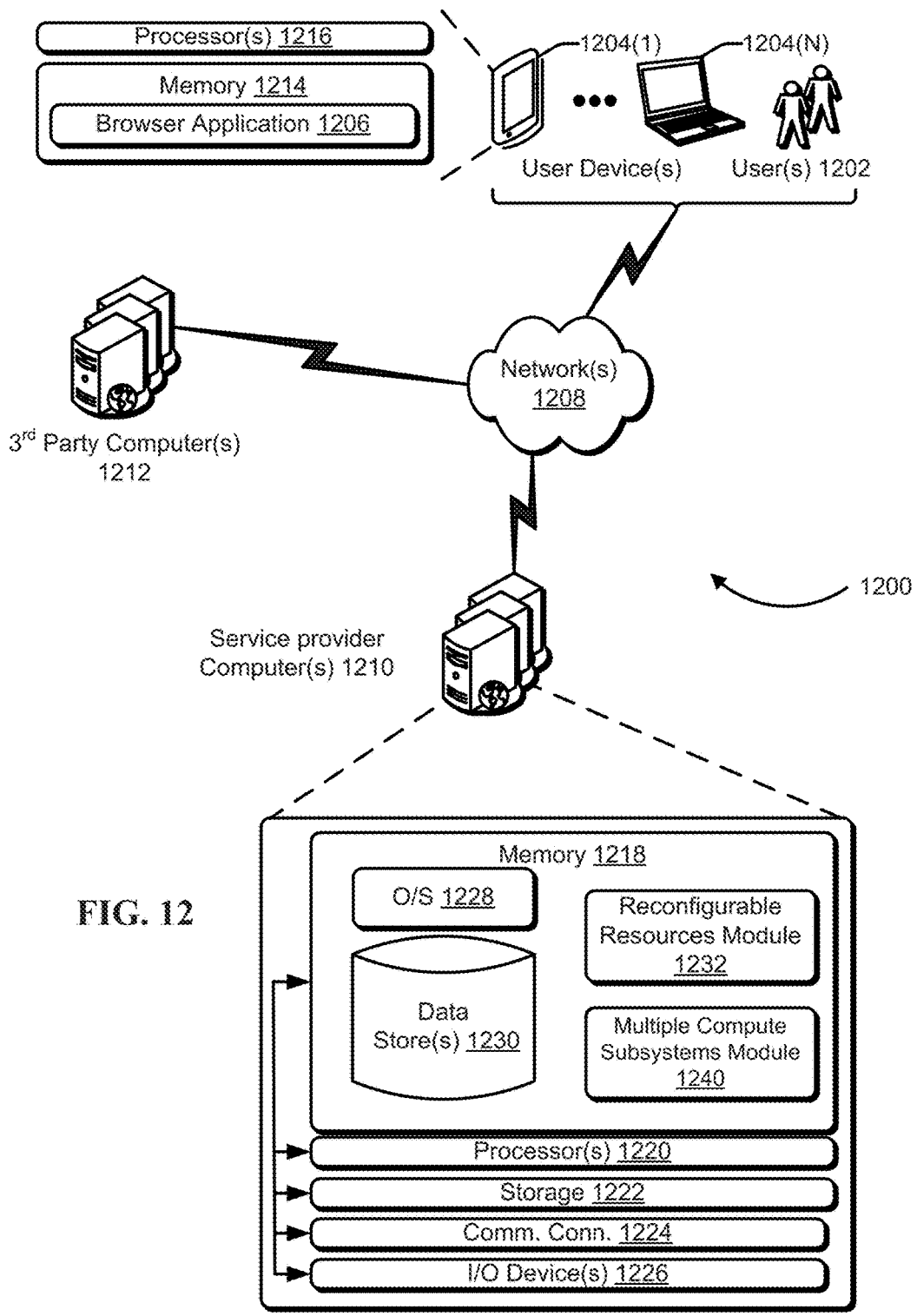
FIG. 12 illustrates an exemplary architecture for features and systems described herein that includes one or more service provider computers and/or a user device connected via one or more networks, according to at least one exemplary embodiment.

FIG. 12 illustrates an exemplary architecture for features and systems described herein that includes one or more service provider computers and/or a user device connected via one or more networks, according to at least one exemplary embodiment. The devices discussed in FIGS. 1-11, may use one or more components of the computing devices described in FIG. 12 or may represent one or more computing devices described in FIG. 12. In architecture 1200, one or more users 1202 may utilize user computing devices 1204(1)-(N) (collectively, user devices 1204) to access application 1206 (e.g., a web browser or mobile device application), via one or more networks 1208. In some aspects, application 1206 may be hosted, managed and/or provided by a computing resources service or service provider. One or more service provider computers 1210 may provide a native application which is configured to run on user devices 1204 which user(s) 1202 may interact with. Service provider computer(s) 1210 may, in some examples, provide computing resources such as, but not limited to, client entities, low latency data storage, durable data storage, data access, management, virtualization, cloud-based software solutions, electronic content performance management, etc. Service provider computer(s) 1210 may also be operable to provide web hosting, computer application development and/or implementation platforms, combinations of the foregoing or the like to user(s) 1202. Service provider computer(s) 1210, in some examples, may communicate with one or more third party computers 1212.

In some examples, network(s) 1208 may include any one or a combination of many different types of networks, such as cable networks, the Internet, wireless networks, cellular networks and other private and/or public networks. While the illustrated example represents user(s) 1202 accessing application 1206 over network(s) 1208, the described techniques may equally apply in instances where user(s) 1202 interact with service provider computer(s) 1210 via user device(s) 1204 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1206 may allow user(s) 1202 to interact with service provider computer(s) 1210 such as to access web content (e.g., web pages, music, video, etc.). Service provider computer(s) 1210, perhaps arranged in a cluster of servers or as a server farm, may host application 1206 and/or cloud-based software services. Other server architectures may also be used to host application 1206. Application 1206 may be capable of handling requests from many users 1202 and serving, in response, various item web pages. Application 1206 can provide any type of website that supports user interaction, including social networking sites, online retailers, informational sites, blog sites, search engine sites, news and entertainment sites and so forth. As discussed above, the described techniques can similarly be implemented outside of application 1206, such as with other applications running on user device(s) 1404.

User device(s) 1204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1204 may be in communication with service provider computer(s) 1210 via network(s) 1208, or via other network connections. Additionally, user device(s) 1204 may be part of the distributed system managed by, controlled by or otherwise part of service provider computer(s) 1210 (e.g., a console device integrated with service provider computers 1210).

In one illustrative configuration, user device(s) 1204 may include at least one memory 1214 and one or more processing units (or processor(s)) 1216. Processor(s) 1216 may be implemented as appropriate in hardware, computer-executable instructions, firmware, or combinations thereof. Computer-executable instruction or firmware implementations of processor(s) 1216 may include computer-executable or machine-executable instructions written in any suitable programming language to perform the various functions described. User device(s) 1204 may also include geo-location devices (e.g., a global positioning system (GPS) device or the like) for providing and/or recording geographic location information associated with user device(s) 1204.

Memory 1214 may store program instructions that are loadable and executable on processor(s) 1216, as well as data generated during the execution of these programs. Depending on the configuration and type of user device(s) 1204, memory 1214 may be volatile (such as random access memory (RAM)) and/or non-volatile (such as read-only memory (ROM), flash memory, etc.). User device(s) 1204 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1214 may include multiple different types of memory, such as static random access memory (SRAM), dynamic random access memory (DRAM), or ROM.

Turning to the contents of memory 1214 in more detail, memory 1214 may include an operating system and one or more application programs or services for implementing the features disclosed herein including at least a user provided input element or electronic service web page, such as via browser application 1206 or dedicated applications (e.g., smart phone applications, tablet applications, etc.). Browser application 1206 may be configured to receive, store and/or display a website or other interface for interacting with service provider computer(s) 1210. Additionally, memory 1214 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1204.

In some aspects, service provider computer(s) 1210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1210 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1210 may be in communication with user device(s) 1204 and/or other service providers via network(s) 1208, or via other network connections. Service provider computer(s) 1210 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1210 may include at least one memory 1218 and one or more processing units (or processor(s)) 1220. Processor(s) 1220 may be implemented as appropriate in hardware, computer-executable instructions, firmware or combinations thereof. Computer-executable instruction or firmware implementations of processor(s) 1220 may include computer-executable or machine-executable instructions written in any suitable programming language to perform the various functions described.

In some instances, hardware processor(s) 1220 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1218 may store program instructions that are loadable and executable on processor(s) 1220, as well as data generated during the execution of these programs. Depending on the configuration and type of service provider computer(s) 1210, memory 1218 may be volatile (such as RAM) and/or non-volatile (such as ROM, flash memory, etc.). Service provider computer(s) 1210 or servers may also include additional storage 1222, which may include removable storage and/or non-removable storage. The additional storage 1222 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1218 may include multiple different types of memory, such as SRAM, DRAM, or ROM.

Memory 1218, the additional storage 1222, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1218 and the additional storage 1222 are all examples of computer storage media. Additional types of computer storage media that may be present in service provider computer(s) 1210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1210. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1210 may also contain communications connection(s) 1224 that allow service provider computer(s) 1210 to communicate with a stored database, another computing device or server, user terminals and/or other devices on network(s) 1208. Service provider computer(s) 1210 may also include I/O device(s) 1226, such as a keyboard, a mouse, a pen, a voice input device, a touch input device, a display, speakers, a printer and the like.

Memory 1218 may include an operating system 1228, one or more data stores 1230 and/or one or more application programs or services for implementing the features disclosed herein, including optionally a reconfigurable resources module 1232 and a multiple compute subsystems module 1240. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

Figure 13:
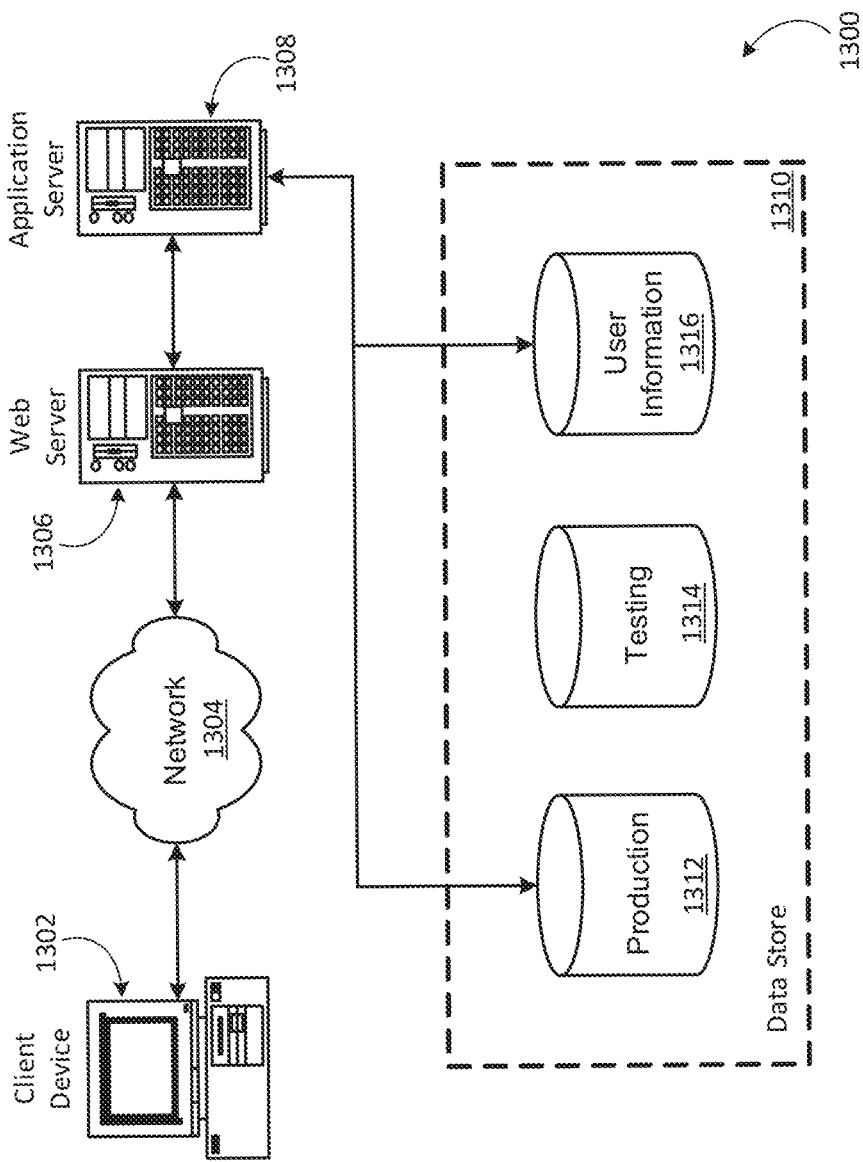
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system on a chip (SoC) configured to communicate with a host system, the SoC comprising:
   a plurality of processing cores, wherein at least one of the plurality of processing cores is reconfigurable to function as part of a network compute subsystem of the SoC or as part of a server compute subsystem of the SoC, wherein the server compute subsystem is configured for providing compute services for the host system, the compute services requested of the host system by a client and being delivered to the client over a network, and wherein the network compute subsystem is configured for managing network traffic, over the network, for the host system and the server compute subsystem, the host system comprising a processor;
   reconfigurable memory resources, wherein at least a portion of the memory resources are reconfigurable to function as part of the network compute subsystem or as part of the server compute subsystem;
   a first physical layer fabric configured to function as part of the network compute subsystem and a second physical layer fabric configured to function as part of the server compute subsystem, wherein the first physical layer fabric and the second physical layer fabric are physically isolated from each other;
   a management compute subsystem coupled to the server compute subsystem and to the network compute subsystem, the management compute subsystem configured for at least configuring the processing cores and the memory resources for the server compute subsystem and the network compute subsystem; and
   a fabric bridge for mapping the configured processing cores and the memory resources to the first physical layer fabric or to the second physical layer fabric, the mapping comprising individually routing the processing cores and the memory resources to the network compute subsystem and the server compute subsystem according to the configuring performed by the management compute subsystem.

2. The SoC of claim 1, further comprising reconfigurable last level cache (LLC) resources, wherein at least a portion of the last level cache resources are reconfigurable to function as part of the network compute subsystem or as part of the server compute subsystem.

3. The SoC of claim 2, wherein the portion of the last level cache resources are configured by the management compute subsystem and are mapped by the fabric bridge to the first physical layer fabric or to the second physical layer fabric.

4. The SoC of claim 1, further comprising reconfigurable I/O resources, wherein at least a portion of the I/O resources are reconfigurable to function as part of the network compute subsystem or as part of the server compute subsystem.

5. The SoC of claim 1, wherein the network compute subsystem includes functionalities of a network interface controller (NIC), the host system includes an x86 processor, and the one of the plurality of processing cores includes an ARM® processor.

6. A system on a chip (SoC) configured to communicate with a host system, the SoC comprising:
   a plurality of processing cores, wherein each processing core is reconfigurable to function as part of a network compute subsystem of the SoC or as part of a server compute subsystem of the SoC, wherein the server compute subsystem is configured for providing compute services for the host system, the compute services requested of the host system by a client and being delivered to the client over a network, and wherein the network compute subsystem is configured for managing network traffic, over the network, for the host system and the server compute subsystem, the host system comprising a processor; and
   a management compute subsystem coupled to the server compute subsystem and to the network compute subsystem, the management compute subsystem configured for managing resources for the server compute subsystem and for the network compute subsystem, wherein the resources comprise the plurality of processing cores and are individually routed to the network compute subsystem and the server compute subsystem according to the managing performed by the management compute subsystem.

7. The SoC of claim 6, further comprising:
   reconfigurable memory resources, wherein at least a portion of the memory resources are reconfigurable to function as part of the network compute subsystem or as part of the server compute subsystem.

8. The SoC of claim 6, further comprising:
   reconfigurable I/O resources, wherein at least a portion of the I/O resources are reconfigurable to function as part of the network compute subsystem or as part of the server compute subsystem.

9. The SoC of claim 8, wherein the I/O resources include a first interface to communicate with the host system, a second interface to communicate with the server compute subsystem, a third interface to communicate with the network compute subsystem and a fourth interface to communicate with the network.

10. The SoC of claim 6, further comprising reconfigurable last level cache (LLC) resources, wherein at least a portion of the last level cache resources are reconfigurable to function as part of the network compute subsystem or as part of the server compute subsystem.

11. The SoC of claim 6 further comprising reconfigurable memory resources, reconfigurable I/O resources and reconfigurable last level cache resources, wherein the management compute subsystem is configured to configure the processing cores, memory resources, I/O resources and the last level cache resources for the server compute subsystem and the network compute subsystem.

12. The SoC of claim 11, further comprising a fabric bridge for mapping the configured processing cores, memory resources, I/O resources and the last level cache resources to a first physical layer fabric for the network compute subsystem or to a second physical layer fabric for the server compute subsystem, wherein the first physical layer fabric and the second physical layer fabric are physically isolated from each other.

13. The SoC of claim 12, wherein the processing cores, memory resources, I/O resources and the last level cache resources are mapped to the server compute subsystem and are coupled to a server compute subsystem cache coherent fabric.

14. The SoC of claim 12, wherein the processing cores, memory resources, I/O resources and the last level cache resources are mapped to the network compute subsystem and are coupled to a network compute subsystem cache coherent fabric.

15. The SoC of claim 6, further comprising:
one or more dedicated processing cores and memory resources for the server compute subsystem; and
one or more dedicated processing cores and memory resources for the network compute subsystem.

16. A method for configuring a system-on-chip (SoC), the method comprising:
configuring, by a management compute subsystem, a plurality of processing cores, wherein at least one processing core is reconfigurable to function as part of a server compute subsystem of the SoC or as part of a network compute subsystem of the SoC, the server compute subsystem and the network compute subsystem coupled to the management compute subsystem, wherein the server compute subsystem is configured for providing compute services, the compute services requested of a host system by a client and being delivered to the client over a network, and wherein the network compute subsystem is configured for managing network traffic, over the network, for the host system and the server compute subsystem;
configuring, by the management compute subsystem, a plurality of memory resources, wherein at least a portion of the memory resources are reconfigurable to function as part of the network compute subsystem or as part of the server compute subsystem; and
configuring, by the management compute subsystem, a plurality of I/O resources, wherein at least a portion of the I/O resources are reconfigurable to function as part of the network compute subsystem or as part of the server compute subsystem,
wherein the configured processing cores, memory resources and the I/O resources are mapped to a first physical layer fabric for the network compute subsystem or to a second physical layer fabric for the server compute subsystem using a fabric bridge, wherein the first physical layer fabric and the second physical layer fabric are physically isolated from each other, and wherein the processing cores, the memory resources, and the I/O resources are individually routed, by the fabric bridge, to the network compute subsystem and the server compute subsystem according to the configuring performed by the management compute subsystem.

17. The method of claim 16, wherein the memory resources include one or more memory controllers, the method further comprising:
setting the one or more memory controllers to function as part of the network compute subsystem or as part of the server compute subsystem.

18. The method of claim 16, further comprising:
assigning one or more dedicated processing cores and memory resources to the server compute subsystem; and
assigning one more dedicated processing cores and memory resources to the network compute subsystem.

19. The method of claim 16, wherein the configuring the plurality of processing cores, the configuring the plurality of memory resources, and the configuring the plurality of I/O resources are performed dynamically by a management compute subsystem of the SoC.

* * * * *

UNITED STATES PATENT AND TRADEMARK OFFICE
CERTIFICATE OF CORRECTION

PATENT NO.        : 10,394,731 B2
APPLICATION NO.   : 14/578010
DATED             : August 27, 2019
INVENTOR(S)       : Mark Bradley Davis and David James Borland Page 1 of 1

It is certified that error appears in the above-identified patent and that said Letters Patent is hereby corrected as shown below:

In the Claims

Column 36, Line 34, Claim 18:
Delete: "assigning one more dedicated processing cores and"
Insert: --assigning one or more dedicated processing cores and--

Signed and Sealed this
Twenty-fourth Day of December, 2019

Andrei Iancu
*Director of the United States Patent and Trademark Office*